United States Patent
Hanratty et al.

(10) Patent No.: US 11,945,124 B2
(45) Date of Patent: Apr. 2, 2024

(54) CONTROLLING MOVEMENT OF A MOBILE ROBOT

(71) Applicant: STMicroelectronics (Research & Development) Limited, Marlow (GB)

(72) Inventors: James M. Hanratty, Musselburgh (GB); Jeffrey M. Raynor, Edinburgh (GB)

(73) Assignee: STMicroelectronics (Research & Development) Limited, Marlow (GB)

(*) Notice: Subject to any disclaimer, the term of this patent is extended or adjusted under 35 U.S.C. 154(b) by 251 days.

(21) Appl. No.: 17/122,722

(22) Filed: Dec. 15, 2020

(65) Prior Publication Data

US 2022/0184815 A1 Jun. 16, 2022

(51) Int. Cl.
*G05D 1/02* (2020.01)
*B25J 9/16* (2006.01)
*B25J 13/08* (2006.01)
*G05D 1/00* (2006.01)

(52) U.S. Cl.
CPC ........... *B25J 9/1697* (2013.01); *B25J 9/1666* (2013.01); *B25J 9/1676* (2013.01); *B25J 9/1684* (2013.01); *B25J 13/089* (2013.01); *G05D 1/0246* (2013.01); *G05D 1/0231* (2013.01); *G05D 1/0234* (2013.01); *G05D 1/0244* (2013.01)

(58) Field of Classification Search
CPC .. G05D 1/0246; G05D 1/0231; G05D 1/0234; G05D 1/0244; B25J 9/1684
See application file for complete search history.

(56) References Cited

U.S. PATENT DOCUMENTS

| 8,565,920 | B2 | 10/2013 | Casey et al. |
| 2017/0297455 | A1 | 10/2017 | Romanov et al. |
| 2018/0014006 | A1 | 1/2018 | Pothier et al. |
| 2018/0252800 | A1* | 9/2018 | Morcom ................. G01S 17/89 |
| 2018/0257231 | A1* | 9/2018 | Nguyen ................ G05D 1/0244 |
| 2018/0267542 | A1 | 9/2018 | Lamon et al. |
| 2019/0202064 | A1 | 7/2019 | Wolff et al. |
| 2019/0223674 | A1 | 7/2019 | Andry et al. |
| 2019/0337151 | A1 | 11/2019 | Fong et al. |

(Continued)

OTHER PUBLICATIONS

Vikram Balaji, M. Balaji, M. Chandrasekaran, M.K.A. Ahamed khan, Irraivan Elamvazuthi, Optimization of PID Control for High Speed Line Tracking Robots, Procedia Computer Science, vol. 76, 2015, pp. 147-154, ISSN 1877-0509.*

(Continued)

*Primary Examiner* — Jeff A Burke
*Assistant Examiner* — Blake A Wood
(74) *Attorney, Agent, or Firm* — Slater Matsil, LLP

(57) ABSTRACT

In certain embodiments, a method includes accessing image information for a scene in a movement path of a mobile robot. The image includes image information for each of a plurality of pixels of the scene, the image information comprising respective intensity values and respective distance values. The method includes analyzing the image information to determine whether to modify the movement path of the mobile robot. The method includes initiating, in response to determining according to the image information to modify the movement path of the mobile robot, sending of a command to a drive subsystem of the mobile robot to modify the movement path of the mobile robot.

23 Claims, 10 Drawing Sheets

(56) References Cited

U.S. PATENT DOCUMENTS

2020/0313468 A1  10/2020  Kumar et al.
2021/0089040 A1* 3/2021  Ebrahimi Afrouzi ........................
                                                                A47L 9/2894

OTHER PUBLICATIONS

A. Ma'arif, A. A. Nuryono and Iswanto, "Vision-Based Line Following Robot in Webots," 2020 FORTEI-International Conference on Electrical Engineering (FORTEI-ICEE), 2020, pp. 24-28, doi: 10.1109/FORTEI-ICEE50915.2020.9249943.*
J. Gonçalves, V. H. Pinto and P. Costa, "A Line Follower Educational Mobile Robot Performance Robustness Increase Using a Competition as Benchmark," 2019 6th International Conference on Control, Decision and Information Technologies (CoDIT), Paris, France, 2019, pp. 934-939, doi: 10.1109/CoDIT.2019.8820556.*
Collins, David, and Gordon Wyeth. "Cerebellar control of a line following robot." Australian Conference on Robotics and Automation. 1999.*
Wikipedia entry for "Velocity", accessed Jul. 26, 2023.*
Anusha, "How to Make Arduino Line Follower Robot?", https://www.electronicshub.org/, Mar. 20, 2017, 46 pages.
Pathak, A et al., "Line Follower Robot for Industrial Manufacturing Process", International Journal of Engineering Inventions, vol. 6, Issue 10, www.ijeijournal.com, Oct. 2017, pp. 10-17, 8 pages.
Sahib, M et al., "Robust Method for Robotic Guidance Using Line Following Method", International Journal of Engineering and Innovative Technology (IJEIT), vol. 4, Issue 3, Sep. 2014, pp. 6-15, 10 pages.

* cited by examiner

FIGURE 5

CONTROLLING MOVEMENT OF A MOBILE ROBOT

TECHNICAL FIELD

This disclosure generally relates to electronic devices and, in particular embodiments, to controlling movement of a mobile robot.

BACKGROUND

Robots continue to become more prevalent throughout society and are used for an increasing number of tasks. In certain implementations, robots are mobile machines that are expected to move about a space substantially autonomously, with little to no human intervention, and while avoiding obstacles or other potentially problematic scenarios.

Some mobile robots are designed to follow a line, and may be referred to as line-following mobile robots. The line may be present on or within a floor or a ceiling, for example, and mark a target path for the mobile robot to follow when moving about an area. As just one example, a line-following robot may be used in a warehouse, and may follow a pre-marked line on a floor of the warehouse to perform certain tasks, such as making deliveries, cleaning, or monitoring workers or other operations.

SUMMARY

In certain embodiments, a mobile robot includes a drive subsystem, an image sensor, one or more processors, and a non-transitory computer-readable medium storing a computer program. The drive subsystem is configured to propel and steer the mobile robot. The image sensor is configured to generate image information for a scene in a movement path of the mobile robot. The image information includes for each of a first plurality of pixels, respective distance values for the scene, and for each of a second plurality of pixels, respective intensity values for the scene. The computer program includes instructions that, when executed by the one or more processors, cause the one or more processors to perform operations that include accessing the image information generated by the image sensor and analyzing the image information to determine whether to modify the movement path of the mobile robot. The operations further include initiating, in response to determining according to the image information to modify the movement path of the mobile robot, sending of a command to the drive subsystem to modify the movement path of the mobile robot.

In certain embodiments, a system includes an image sensor for attachment to a mobile robot and a non-transitory computer-readable medium storing a computer program. The image sensor is configured to capture an image of a scene in a movement path of the mobile robot. The image includes image information for each of a plurality of pixels of the scene, the image information including respective intensity values and respective distance values. The computer program includes instructions that, when executed by one or more processors, cause the one or more processors to perform operations comprising accessing the image information; analyzing the image information to determine whether to modify the movement path of the mobile robot; and initiating, in response to determining according to the image information to modify the movement path, sending of a command to a drive subsystem of the mobile robot to modify the movement path.

In certain embodiments, a method includes accessing image information for a scene in a movement path of a mobile robot. The image includes image information for each of a plurality of pixels of the scene, the image information comprising respective intensity values and respective distance values. The method includes analyzing the image information to determine whether to modify the movement path of the mobile robot. The method includes initiating, in response to determining according to the image information to modify the movement path of the mobile robot, sending of a command to a drive subsystem of the mobile robot to modify the movement path of the mobile robot.

Embodiments can be implemented in hardware, software, or in any combination thereof.

BRIEF DESCRIPTION OF THE DRAWINGS

For a more complete understanding of this disclosure and the advantages thereof, reference is now made to the following descriptions taken in conjunction with the accompanying drawings, in which:

FIG. 5 illustrates a top view of an example scenario in which a mobile robot is following a line and an obstacle (e.g., an obstruction) is detected, along with associated image information, according to certain embodiments of this disclosure;

DETAILED DESCRIPTION OF ILLUSTRATIVE EMBODIMENTS

Figure 1A:
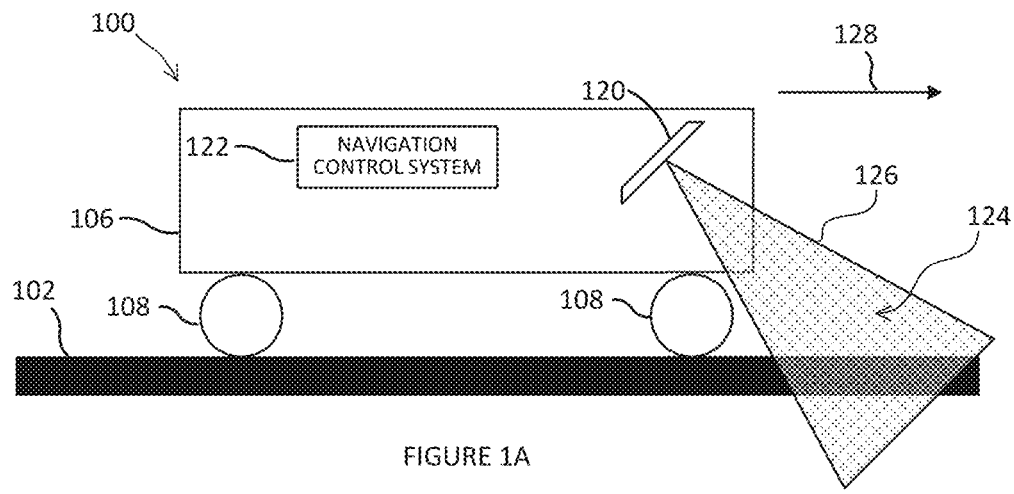
FIGS. 1A-1B illustrate cross-sectional and top views, respectively, of an example mobile robot in an environment, according to certain embodiments of this disclosure.

Among the techniques mobile robots may use to move about a space include line following and obstacle detection and avoidance. In the case of a line-following mobile robot, the mobile robot may be a self-operating mobile machine that follows one or more lines on a floor or ceiling. The line may be a color that contrasts with a color of the floor on which the mobile robot is moving, and may include one or more line segments, may be straight, angled, or curved, and may follow any suitable path. Furthermore, the line may be a part of a larger network of potentially intersecting lines.

Conventional techniques for a line-following mobile robot typically rely on simplistic infrared (IR) sensors to detect a line. These simplistic IR sensors commonly are analog sensors that emit a light pulse and measure an amplitude of a return signal to provide a single measure of intensity for a single portion of a scene in a field of view of the IR sensor (e.g., in a path of the mobile robot). Thus, such simplistic IR sensors are only able to detect a single intensity measurement at a time. In some cases, to more effectively follow a line, at least three of these simplistic IR sensors are positioned on a mobile robot to detect, for example, the floor to the left of the line, the line, and the floor to the right of the line. To the extent additional lines are to be followed (e.g., parallel lines marking a target path of the mobile robot), yet more of these IR sensors would be used. Additionally, these simplistic IR sensors have a limited range, typically around a few centimeters, meaning that these simplistic IR sensors must be placed very near to the location of the line (e.g., on the bottom of the robot, very near to floor) for reliable detection to occur, which limits options for placement of an image sensor on a mobile robot.

Additionally, to the extent obstacle detection and/or avoidance are desired, yet another one or more different types of sensors are needed with conventional systems to detect obstacles in proximity to the mobile robot. These additional sensors may include ultrasonic or other range-finding sensors.

This disclosure provides techniques for controlling movement of a mobile robot. Embodiments of this disclosure include an image sensor positioned on a mobile robot. The image sensor is configured to capture image information that includes both intensity values and distance values for a scene in a field of view of the image sensor (e.g., in a path of the mobile robot). In certain embodiments, the image sensor is capable of capturing this image information (including both the intensity information and the distance information) for multiple portions of the scene, referred to as pixels or zones. This allows a single image sensor to capture both intensity and depth information for multiple (and potentially many) objects in a scene.

A mobile robot may include a navigation control system that controls movement of a robot about an area. The navigation control system of a mobile robot may access the image information captured by the image sensor (including both the intensity information and the distance information), and analyze the information to make decisions about the movement of the mobile robot. For example, the navigation control system may use one or both of the intensity values and the distance values to facilitate line following. As another example, the navigation control system may use one or both of the intensity value and the distance values for detecting obstacles in an movement path of the mobile robot, and for determining an evasive action if appropriate. These and additional details of embodiments of this disclosure are described below.

Figure 1B:
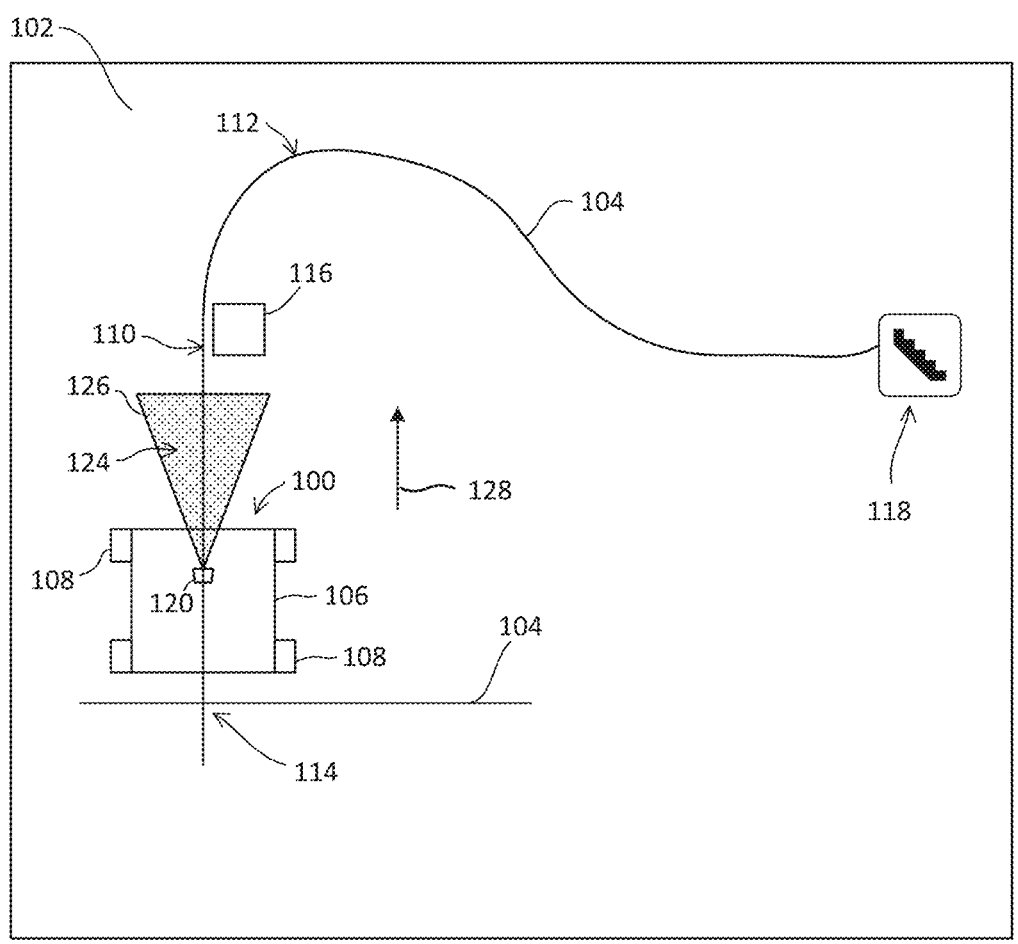

FIGS. 1A-1B illustrate cross-sectional and top views, respectively, of an example mobile robot 100 in an environment, according to certain embodiments of this disclosure. In particular, FIG. 1A illustrates a cross-sectional view of mobile robot 100 moving on a floor 102, and FIG. 1B illustrates a top view of mobile robot 100 following a line 104 on floor 102.

Mobile robot 100 may include any suitable type of machine that is able to move about a space at least partially autonomously, with little to no human intervention. Specific examples of mobile robots include a robot on a warehouse/factory, a toy robot, a vacuum cleaner, an aerial drone, and a self-driving car or other vehicle for transporting people or other cargo, any one of which is capable of moving at least partially autonomously. Additionally, robot 100 may move in any suitable way, such as by rolling (with wheels) or flying. In the illustrated example, robot 100 includes body 106 and wheels 108, though the particular implementation of robot 100 will depend on the type of robot used. For brevity, mobile robot 100 will be referred to primarily as robot 100 throughout the remainder of this description.

Floor 102 may include an indoor or outdoor supporting surface such as a floor in a building or an outdoor ground surface, and may include any suitable material or combination of materials. Furthermore, although described as a floor, floor 102 could be any suitable surface in any suitable orientation (e.g., a ceiling, a wall, etc.) depending on the implementation or capabilities of robot 100.

Line 104 marks a potential target movement path for robot 100 to follow when robot 100 navigates about an area in which floor 102 is located. Where multiple lines 104 are present, each line 104 marks a potential target movement path for robot 100 to follow. Line 104 may be implemented in any suitable manner. For example, line 104 may be painted on floor 102, marked using one or more strips of tape, embedded in floor 102 (e.g., implanted in the material of floor 102), or provided on or in the floor in any other suitable manner.

In general, to facilitate detection of line 104 by robot 100, line 104 is a color and/or material that reflects radiation (light) differently than floor 102 so that an image sensor of robot 100 that measures an intensity of light reflected off floor 102 and off line 104 will detect noticeably different intensity values for light reflected off floor 102 and light reflected off line 104. For example, line 104 may be a color that contrasts with a color of floor 102, and potentially a color that highly contrasts with a color of floor 102. As a particular example, when floor 102 is a dark color (e.g., black, dark grey, dark brown, etc.), it may be desirable for line 104 to be a relatively light color (e.g., white, yellow, a neon color, etc.). As another particular example, when floor 102 is a light color (e.g., white, light grey, light brown, etc.), it may be desirable for line 104 to be a relatively dark color (e.g., black, dark red, etc.).

In certain embodiments, line 104 is a retroreflector, such as retroreflective tape, paint, or another suitable retroreflective material, which may facilitate detection of reflected radiation by an image sensor of robot 100. In certain embodiments, the retroreflector may be covered by an organic resin or other IR-pass spectral filter material that blocks visible light, making line 104 (e.g., the retroreflector) difficult or impossible to see with the naked human eye, but that passes IR light, which may be emitted by an image sensor of robot 100 or reflected back to the image sensor by line 104 (e.g., the retroreflector). In certain embodiments, the IR-pass spectral filter material transmits (e.g., at greater than 50% and absorption less than 10%) IR light (e.g., about 740 nm to about 1100 nm) from the image sensor, and the IR light is reflected from the retroreflector back through the IR-pass spectral filter material and can be detected by the image sensor. Visible light (e.g., about 400 nm to about 700 nm) may absorbed by the IR-pass spectral filter material or reflected, depending on the desired color, by the IR-pass spectral filter material. The spectral response (e.g., reflectance vs. wavelength) may be selected to match the color of the floor to make line 104 less visible to the naked human eye.

Although a single line 104 is shown for marking a target path of robot 100, this disclosure contemplates multiple lines marking a target path for robot 100, such as multiple parallel lines, an example of which is described below with reference to FIG. 6.

Line 104 may include straight portions 110, curved portions 112, and intersecting portions 114. Additionally, one or more obstacles may be present on the target path of robot 100 or otherwise located in or around the area in which robot 100 is moving. Obstacles may include an obstruction 116 (e.g., a box, a wall, person, or other object in the movement path of robot 100), a cliff 118 (e.g., a staircase or other drop-off), or other suitable types of obstacles.

Despite the complex nature of line 104, potentially including straight portions 110, curved portions 112, and intersecting portions 114, and the potential presence of obstacles (e.g., obstruction 116 or cliff 118), robot 100 is configured to move about floor 102 in a generally autonomous manner, though occasional human intervention may be appropriate.

Robot 100 may detect line 104 and follow a path marked by line 104. To that end, robot 100 includes image sensor 120 and navigation control system 122. Image sensor 120 is configured to detect image information about a scene in a movement path of robot 100 by emitting radiation 124 (light), and to detect image information about portions of the scene that are within a field of view 126 of image sensor 120. In the illustrate example, robot 100 is moving in a direction marked by arrow 128. The image information captured by image sensor 120 may include intensity values and distance values.

Intensity values generally are a measure of the amount of light reflected off an object in a field of view of image sensor 120. That is, image sensor 120 includes a light source (e.g., a laser) that emits radiation (light) onto a scene, and objects within that scene that are within field of view 126 of the emitted radiation may reflect some or all of that light back toward image sensor 120. Image sensor 120 measures the reflected light by measuring the intensity of the reflected light. Intensity values may be particularly useful for distinguishing certain objects in the scene, but may be useful for a variety of purposes.

Distance values generally indicate the distance from image sensor 120 to objects in the scene. In certain embodiments, image sensor 120 captures distance values using time-of-flight techniques. In a time-of-flight technique, image sensor 120 extracts the depth of an object in the scene by detecting the time taken by light from an optical source of image sensor 120 to strike a surface of the object and be reflected back to image sensor 120, where the reflected light may be detected by a detector in an optical receiver of image sensor 120. Distance values may be particularly useful for detecting obstacles in a scene (e.g., in a movement path of robot wo), but may be useful for a variety of purposes.

In certain embodiments, image sensor 120 is configured to capture image information for multiple zones of a scene, referred to as pixels. The ability to capture image information about multiple individual pixels of a scene can allow image sensor 120 to capture multiple objects within a single image of a scene.

As just one example, image sensor 120 may include an optical source (e.g., emitter) that uniformly illuminates a scene and an optical receiver that includes a plurality of detectors arranged in a two-dimensional (2D) array. Each detector is capable of measuring a time-of-flight depth and intensity image of the scene. Thus, the image information captured and output by image sensor 120 may be an image that includes an intensity map of the scene (or at least the portion in the field of view of image sensor 120) and a depth map of the scene (or at least the portion in the field of view of image sensor 120).

In general, the image acquisition by image sensor 120 may be based on various imaging schemes but, as a particular example, image sensor 120 may be a light detection and ranging (LIDAR) system including, for example, a scannerless time-of-flight camera. Additional details of an example image sensor 120 are described below with reference to FIG. 2.

Navigation control system 122 controls movement of robot 100 around floor 102. Navigation control system 122 may include any suitable combination of hardware, firmware, and software. For example, navigation control system 122 may include a drive subsystem of robot 100 (e.g., including associated motors, actuators, and other suitable components for implementing propulsion and steering of robot 100), software for making decisions about how to control the drive subsystem and ultimately propulsion and steering of robot 100, and any other suitable components.

In making decisions and issuing commands to control movement of robot 100, navigation control system 122 may access information provided by image sensor 120 (e.g., image information), and analyze that information to determine whether to modify a movement path of robot 100. For example, if the image information provided by image sensor 120 indicates that the movement path of robot 100 is deviating from the target movement path along line 104, then navigation control system 122 may cause robot 100 to turn to continue a movement path along the target movement path of line 104. As another example, if the image information provided by image sensor 120 indicates that an obstacle is present in a movement path of robot 100, then navigation control system 122 may cause robot 100 to change directions (e.g., to avoid the obstacle), stop, or perform another suitable operation. Thus, robot 100 may use the image information (e.g., including intensity values and distance values) provided by image sensor 120 for line following, object detection, or both.

Although image sensor 120 is illustrated separately from navigation control system 122, image sensor 120 may be considered part of navigation control system 122 (though, of course, information provided by image sensor 120 may be used for a variety of purposes, including purposes other than navigation).

Figure 2:
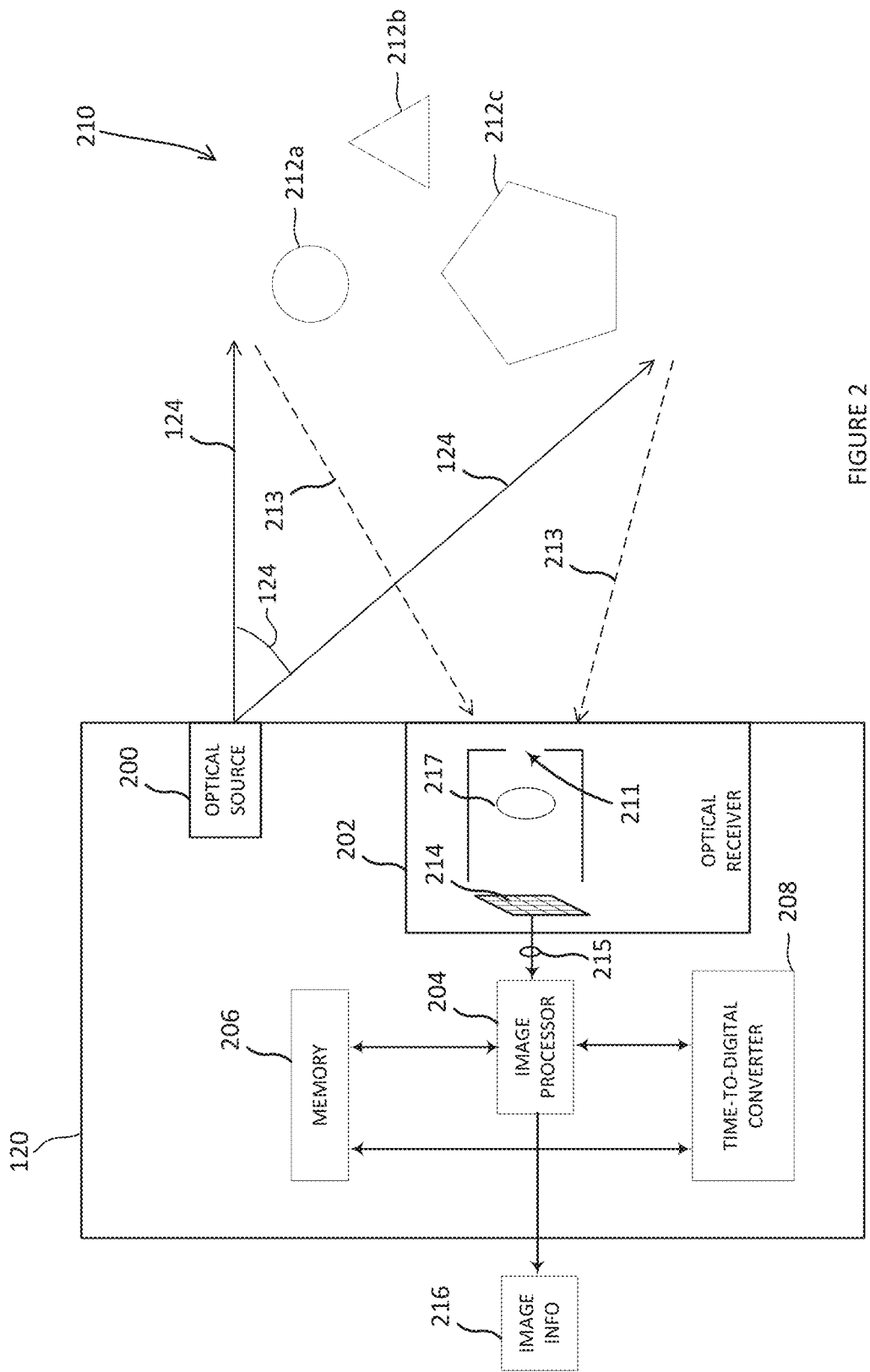
FIG. 2 illustrates an example image sensor, according to certain embodiments of this disclosure.

FIG. 2 illustrates an example image sensor 120, according to certain embodiments of this disclosure. In the illustrated example, image sensor 120 includes an optical source 200, an optical receiver 202, an image processor 204, a memory 206, and a time-to-digital converter 208, which may or may not be arranged in the manner shown. In general, image sensor 120 provides a three-dimensional depth and intensity image corresponding to the field of view of optical source 200 (e.g., field of view 126). In certain embodiments, image sensor 120 is a self-contained IC package that can provide these capabilities.

In certain embodiments, optical source 200 is a single coherent light source configured to uniformly illuminate a scene 210 within a field of view 126 of optical source 200 (e.g., field of view 126). Scene 210 may be, for example, a portion of the environment in which robot 100 is operating, and optical source 200 may illuminate a portion of that environment within a field of view 126 of optical source 200. Scene 210 may include one or more objects 212 (shown as objects 212a, 212b, and 212c) at the same or varying distances from image sensor 120. For example, objects 212 may include floor 102, line 104, obstacles (e.g., obstruction 116 or cliff 118), or any other suitable types of objects. Image sensor 120 is capable of providing intensity information and distance information regarding the portion of scene 210 that falls within field of view 126 of optical source 200.

Optical source 200 may include one or more optical emitters. For example, optical source 200 may include a single optical emitter or multiple optical emitters arranged in suitably dimensioned (e.g., N×N or N×M) and shaped (e.g., square, circular, ellipsoidal) array. Each optical emitter may include one or more infrared sources, modulated light emitting diodes (LEDs), semiconductor lasers (e.g., a vertical-cavity surface-emitting lasers (VCSELs), quantum well lasers, quantum cascade lasers, interband cascade lasers, or vertical external-cavity surface-emitting lasers (VECSELs), or other suitable lasers), or combinations thereof, although other types of optical sources compatible with time-of-flight principles may be used. In certain embodiments, optical source 200 is a timed laser source synchronized using, for example, image processor 204 and time-to-digital converter 208 to allow for time-of-flight measurements. In certain embodiments, optical source 200 includes a lens to cover a wider field of view 126 than might be illuminated solely by optical source 200.

Optical source 200 may include one or more optical source drivers that control operation of optical sources 200 and that are configured to generate a drive current that is capable of activating the single emitter, the multiple emitters, or a subset of the multiple emitters of optical source 200, causing the activated emitter(s) to emit photons.

Radiation 124 (light) emanating from optical source 200 may be incident upon at least a subset of scene 210 (e.g., the portions of scene 210 that fall within a field of view 126 of optical source 200) and objects 212 (in this example, objects 212a-212c) in the subset of scene 210. Radiation 124 is reflected off objects 212a-212c in the subset of scene 210, resulting in reflected radiation 213. Although radiation 124 and reflected radiation 213 are represented in FIG. 2 by two arrows each, all radiation incident on and reflected from the objects 212a-212c in the subset of scene 210 may be combined in a beam or cone of radiation. While some part of the radiation 124 may be scattered depending upon the surface features of the object 212a-212c, a significant part of the radiation 124 may be reflected, producing reflected radiation 213.

Optical receiver 202 receives reflected radiation 213 and generates an output signal 215 in response to reflected radiation 213 striking optical receiver 202. For example, reflected radiation 213 may be received through an aperture 211 of optical receiver 202. Reflected radiation 213 may pass through a converging lens 217 to project an optical image of the scene onto a 2D detector array 214. To increase the signal-to-noise ratio, a bandpass filter in optical receiver 202 may be used to select the optical signal used by image sensor 120 and filter out extraneous radiation.

Optical receiver 202 includes a plurality of detectors arranged, for example, in a matrix configuration, which will be referred to as detector array 214. Detectors of detector array 214 are configured to capture measurements for a depth (e.g., corresponding to a distance to a detected object) and an intensity image corresponding to a subset of field of view 126 of the optical source 200—each detector being a photon sensitive element or plurality thereof (e.g., macropixel). In other words, the depth and intensity sensor provides a reconstructed depth and intensity image of the subset of the field of view associated with the respective detector of detector array 214. In certain embodiments, each detector of detector array 214 operates independently of the other detectors and provides an output to image processor 204. In certain embodiments, detector array 214 is an array of single-photon avalanche diode (SPAD) devices (a SPAD array). In such an embodiment, each SPAD device may correspond to one of the detectors of detector array 214.

Each detector of the 2D detector array 132 may be a solid-state diode (e.g., a silicon p-n junction diode). The diode photodetector may be operated at a low reverse-bias (e.g., 1 V to 5 V), in which case the photodetector is referred to simply as photodiode. In another technique, also using a p-n junction diode, a high reverse bias in excess of the diode's reverse breakdown voltage (e.g., 12 V to 30 V) is applied.

The photodiode reverse current may be roughly proportional to the light intensity and may be integrated using electronic circuitry of image processor 204 over a period of microseconds to about a millisecond, generating a signal with a robust SNR. With the reference signal and phase detection circuitry, image processor 204 may detect the phase shift between a modulating radio frequency (RF) signal in the reference waveform (e.g., used by optical source 200) and reflected radiation 213 received at a detector of detector array 214. The phase difference may be used by image processor 204 (with time-of-flight capabilities) to obtain the depth information for a respective pixel of detector array.

In certain embodiments, the SPAD-based time-of-flight depth imaging technique may use an outgoing optical signal (radiation 124) comprising a train of laser pulses generated in optical source 200 with an RF signal source and an optical modulator. Reflected radiation 213 may be projected onto detector array 214. The operating principle of a SPAD makes it suitable for detecting the leading edges of optical pulses. The time-delay between the pulse edges of the outgoing signal and those of the incoming signal may be obtained by image processor 204 by comparing the detected signal with the reference signal provided by optical source 200. Image processor 204 may use the time-delay information for each detector to determine the depth information for the respective pixel.

In its quiescent or dark state, a SPAD photodetector is biased at such a high electric field that even a single photon absorbed in the high field region, resulting in one electron-hole pair generation can trigger an avalanche of electron-hole pairs generated by impact ionization in the diode. This makes the SPAD detector suitable for detecting the leading edge of an optical pulse. The avalanche process is a self-sustaining chain of impact ionization events that creates a rapid increase in current, often in about tens of picoseconds. The SPAD may be used in conjunction with a quenching resistor that prevents a high reverse current to flow for a long enough time to irreversibly damage the device. In certain embodiments, the quenching circuit forces the current to subside and quickly resets the SPAD to its quiescent state at the end of the optical pulse with a time constant of about 1 ns to about 30 ns. The high reverse bias regime is sometimes called the Geiger zone in analogy between the beep of a Geiger counter detecting the arrival of an ionizing particle and the sharp spike in current produced by a SPAD detecting an ionizing photon.

As described above, optical receiver 202 may include multiple detectors arranged in a detector array 214. A pixel or group of pixels of detector array 214 may correspond to a portion of scene 210. That is, a pixel or group of pixels of detector array 214 may receive reflected radiation 213 corresponding to a portion of scene 210 that falls within field of view 126 of image sensor 120, while other pixels or groups of pixels receive reflected radiation 213 corresponding to other portions of scene 210 that fall within field of view 126 of image sensor 120. In this way, detector array 214 is able to provide image information for multiple pixels, or zones, of scene 210.

Time-to-digital converter 208 samples photon events with precise timing synchronized with optical source 200, which allows quantization of photon events in range measurements. Time-to-digital converter 208 may measure the time interval between the emission of radiation 124 from optical source 200 and the arrival of reflected radiation 213 at optical receiver 202 and provide an indication of the time interval to image processor 204. Time-to-digital converter 208 and/or image processor 204 may compute the distance to an object in a scene using this time interval measurement, where to is emission time of radiation 124, which subsequently reflects of an object (e.g., object 212) in scene 210 as reflected radiation 213, and t1 is a time at which reflected radiation (or a portion thereof) is received at optical receiver 202, and the measured distance is photon travel time (t1−t0)/2*speed of light. Time-to-digital converter 208 may be a single time-to-digital converter serving all detectors of detector array 214, or image sensor 120 may include multiple time-to-digital converters 208 each serving one or more detectors of detector array 214. Time-to-digital converter 208 provides a timing sequence that allows for the time synchronization between optical source 200 and components of optical receiver 202 and image processor 204 to perform time-of-flight measurements.

Each detector of detector array 214 captures measurements for a corresponding sub-portion of the portion of scene 210 within field of view 126 of optical source 200 as captured by the reflected light received at that detector and using associated time-of-flight information. These sub-portions of the portion of scene 210 within field of view 126 of optical source 200 may be referred to as pixels or zones of scene 210 (and ultimately of the image of scene 210 generated by image processor 204, as described below). Thus, each detector of detector array 214 is capable of detecting one or more objects in scene 210 within field of view 126 of optical source 200. This means that image sensor 120 may be capable of detecting measurements (e.g., intensity and distance information) for at least as many objects as there are detectors in detector array 214.

The number of pixels may be referred to as the resolution of the image. In some instances multiple detectors of detector array may be grouped together to form a pixel, such that a given pixel is associated with more than one detector. In certain embodiments, the intensity map and the depth map have the same resolution. As just one example, image sensor 120 may capture an 8×8 image of scene 210, for a total of sixty-four pixels. In certain other embodiments, pixels of detector array 214 may be grouped one way (resulting in M groups) for making intensity measurements and another way (resulting in N groups) for making distance measurements, such that the resolution (number of pixels) for the intensity map is different than the resolution (number of pixels) for the depth map.

Image processor 204 is communicatively coupled to optical source 200, optical receiver 202, memory 206, and time-to-digital converter 208 by one or more appropriate wireless or wireline interfaces. Image processor 204 may be any component or collection of components adapted to perform computations and/or other processing-related tasks. Image processor 204 can be, for example, a microprocessor, a microcontroller, a control circuit, a digital signal processor, a field-programmable gate array (FPGA), an application-specific integrated circuit (ASIC), a system-on-chip (SoC), a graphics processing unit (GPU), or combinations thereof. Furthermore, image sensor 120 may include any suitable number of image processors 204, or multiple processors may collectively form a single image processor 204. Further, in some embodiments, image processor 204 is a processor of a host device (e.g., robot 100). In embodiments, image processor 204 computes image information 216 (which also may be referred to simply as an image) of a portion of scene 210 for image sensor 120.

Memory 206 may include any suitable combination of volatile or non-volatile computer storage. Memory 206 may include any type of non-transitory system memory such as static random access memory (SRAM), dynamic random access memory (DRAM), synchronous DRAM (SDRAM), read-only memory (ROM), or a combination thereof. In certain embodiments, memory 206 may include ROM for use at boot-up, and DRAM for program, firmware, and data storage for use while executing programs. Memory 206 may include, for example, one or more of a solid-state drive, hard disk drive, a magnetic disk drive, a removable memory drive, or an optical disk drive.

Memory 206 may be any component or collection of components adapted to store programming and/or instructions for execution of image processor 204. In an embodiment, memory 206 includes a non-transitory computer-readable medium. Memory 206 may be configured to store data, programs, firmware, operating systems, and other information and make the data, programs, firmware, operating systems, and additional information accessible to image processor 204. In certain embodiments, image sensor 120 may use a host memory (e.g., of robot 100) instead of the memory 206. In such an embodiment, image sensor 120 might or might not include memory 206.

Image processor 204 selectively toggles a subset of the detectors of detector array 214 in accordance with suitable sampling techniques. The selective sampling allows capturing the depth and intensity measurements based on a sample pattern that varies at predefined time intervals. Image processor 204 generates a final image (including desired image information) in accordance with the reconstructed depth and intensity information of the subset of the field of view received by the sampled subset of detectors. Image processor 204 may output some or all of the final image as image information 216. Image processor 204 may store the image (including image information) in memory 206 and/or may transmit the image information to another component.

Image information 216 may include intensity values and distance values for the portion of scene 210 within field of view 126 of optical source 200. The intensity values collected by detector array 214 and processed by image processor 204 collectively form an intensity map of the portion of scene 210 within field of view 126 of optical source 200. The distance values collected by detector array 214 and processed by image processor 204 collectively form a depth map of the portion of scene 210 within field of view 126 of optical source 200.

The intensity values of image information 216 may provide, for a particular instance in time and position of robot 100, an intensity map of a portion of a scene (e.g., scene 210) in a movement path of robot 100, with pixels that correspond to particular areas of that portion of scene. The distance values of image information 216 may provide, for a particular instance in time and position of robot 100, a depth map of a portion of a scene (e.g., scene 210) in a movement path of robot 100, with pixels that correspond to particular areas of that portion of scene and respective distance values for those pixels. As robot 100 moves along a movement path, image sensor 120 captures additional image information 216 for the updated time and position of robot 100. Given the number of pixels that image sensor 120 may be capable of detecting, the intensity map and depth map can provide relatively detailed information about a scene 210, all using a single image sensor 120 in certain embodiments.

This disclosure contemplates image information 216 including any suitable information. For example, in addition to intensity values and depth values for a suitable number of pixels, image information 216 may include noise information determined by image processor 204, time information, and any other suitable information.

Although this disclosure contemplates image sensor 120 providing image information to other devices (e.g., navigation control system 122 of robot 100) in any suitable format, in certain embodiments, image sensor 120 (e.g., image processor 204) provides image information 216 in a digital format.

Figure 3:
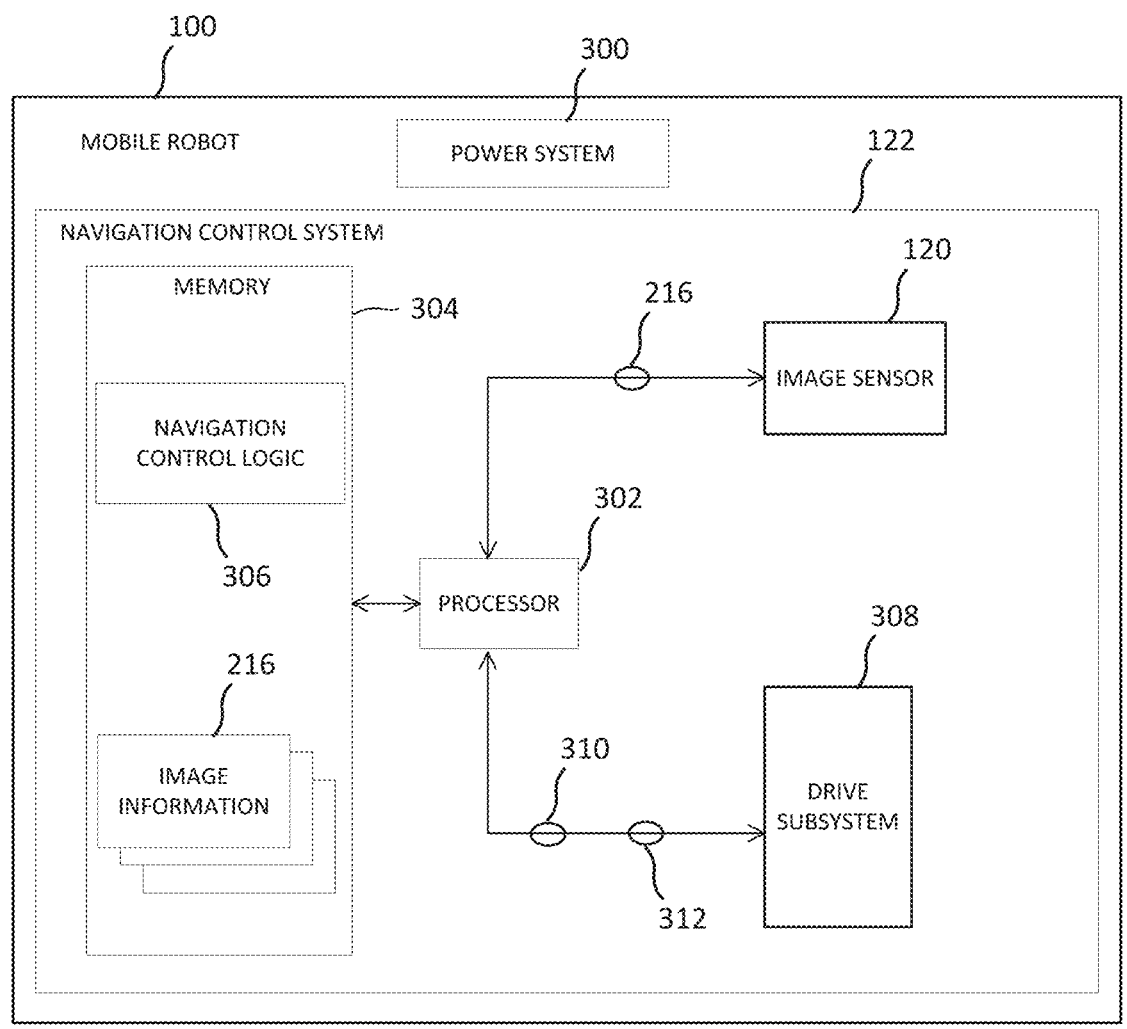
FIG. 3 illustrates a block diagram of a mobile robot and selected components of mobile robot, including a navigation control system, according to certain embodiments of this disclosure.

FIG. 3 illustrates a block diagram of mobile robot 100 and selected components of mobile robot 100, including navigation control system 122, according to certain embodiments of this disclosure. In particular, in the illustrated example, robot 100 includes navigation control system 122 and power system 300.

Navigation control system 122 includes image sensor 120, processor 302, memory 304 (storing navigation control logic 306 and image information 216), and drive subsystem 308.

Processor 302 may be any component or collection of components adapted to perform computations and/or other processing-related tasks. Processor 302 can be, for example, a microprocessor, a microcontroller, a control circuit, a digital signal processor, an FPGA, an ASIC, an SoC, a GPU, or combinations thereof. Furthermore, navigation control system 122 may include any suitable number of processors 302, or multiple processors may collectively form a single processor 302 of navigation control system 122.

Memory 304 may include any suitable combination of volatile or non-volatile computer storage. Memory 304 may include any type of non-transitory system memory such as SRAM, DRAM, SDRAM, ROM, or a combination thereof. In certain embodiments, memory 304 may include ROM for use at boot-up, and DRAM for program, firmware, and data storage for use while executing programs. Memory 304 may include, for example, one or more of a solid-state drive, hard disk drive, a magnetic disk drive, a removable memory drive, or an optical disk drive.

Memory 304 may be any component or collection of components adapted to store programming and/or instructions for execution of processor 302. In an embodiment, memory 304 includes a non-transitory computer-readable medium. Memory 304 may be configured to store data, programs, firmware, operating systems, and other information and make the data, programs, firmware, operating systems, and additional information accessible to processor 302.

Memory 304 stores navigation control logic 306, which includes software code (executable by processor 302) to process image information 216 and determine appropriate instructions for controlling robot 100 based on an analysis of image information 216. Processor 302 may execute the instructions of navigation control logic 306 to perform the operations defined by navigation control logic 306. Although primarily described as software, navigation control logic 306 may be implemented using any suitable combination of hardware, firmware, and software.

Example operations implemented by navigation control logic 306 are described below. Although navigation control logic 306 may be described as performing certain operations or otherwise causing certain operations to be performed, it will be understood that in certain embodiments, processor 302 (or another suitable component of robot 100) may perform those operations or cause those operations to be performed.

Navigation control logic 306 may include instructions for accessing image information 216 generated by image sensor 120. For example, image sensor 120 may provide image information 216 to processor 302, which may store image information 216 in memory 304. Additionally or alternatively, image sensor 120 may have direct access to memory 304 and may store image information 216 directly to memory 304. Image sensor 120 may provide image information 216 to processor 302 (or store image information 216 in memory 304) at a suitable interval, or may do so in response to a request from processor 302.

Navigation control logic 306 may include instructions for analyzing image information 216 to determine whether to modify a movement path of robot 100. For example, analyzing image information 216 may include analyzing intensity values of image information 216, distance values of image information 216, or both to determine whether to modify a movement path of robot 100. In other words, analyzing image information 216 may include analyzing the intensity map of image information 216 and the depth map of image information 216 to determine whether to modify a movement path of robot 100.

This disclosure contemplates navigation control logic 306 using any suitable techniques to analyze image information 216 to determine whether to modify a movement path of robot 100. For example, navigation control logic 306 may implement one or more of edge detection (or other thresholding) techniques, comparisons of current image information 216 to one or more previous instances of image information 216, or other suitable techniques for analyzing image information 216 to determine whether to modify a movement path of robot 100. Furthermore, in making a particular determination of whether to modify a movement path of robot 100, navigation control logic 306 may consider intensity values, distance values, or both (as well as any other suitable information).

For example, navigation control logic 306 may provide instructions for analyzing the intensity values of a given instance of image information 216 (e.g., an intensity map of image information 216) to determine whether a position of line 104 has deviated from an expected location in the intensity map, thereby determining whether a movement path of robot 100 has deviated or will deviate from a target movement path (e.g., line 104).

In certain embodiments, determining, according to the intensity values, that the movement path of robot 100 has deviated from the target movement path (e.g., line 104) in a particular direction may include determining that an intensity value for a particular pixel meets a predetermined condition, as described below.

Navigation control logic 306 may be programmed to consider certain intensity values as indicative of floor 102 and certain intensity values as indicative of line 104, and those intensity values may depend on the reflectivity of floor 102 and line 104 (which could be determined at least in part by the colors and/or materials of floor 102 and line 104). Furthermore, for a given implementation, navigation control logic 306 may be programmed to expect certain pixels to have intensity values indicative of line 104 for the movement path of robot 100 to correspond to the target movement path (e.g., line 104). Navigation control logic 306 could be pre-programmed (during production or subsequently by a user) with this information. Additionally or alternatively, navigation control logic 306 may determine a suitable width of line 104, intensity values indicative of line 104, and location of pixels expected to have intensity values indicative of line 104 after deployment using machine learning techniques as robot 100 is used in a particular type of environment.

Figure 4A:
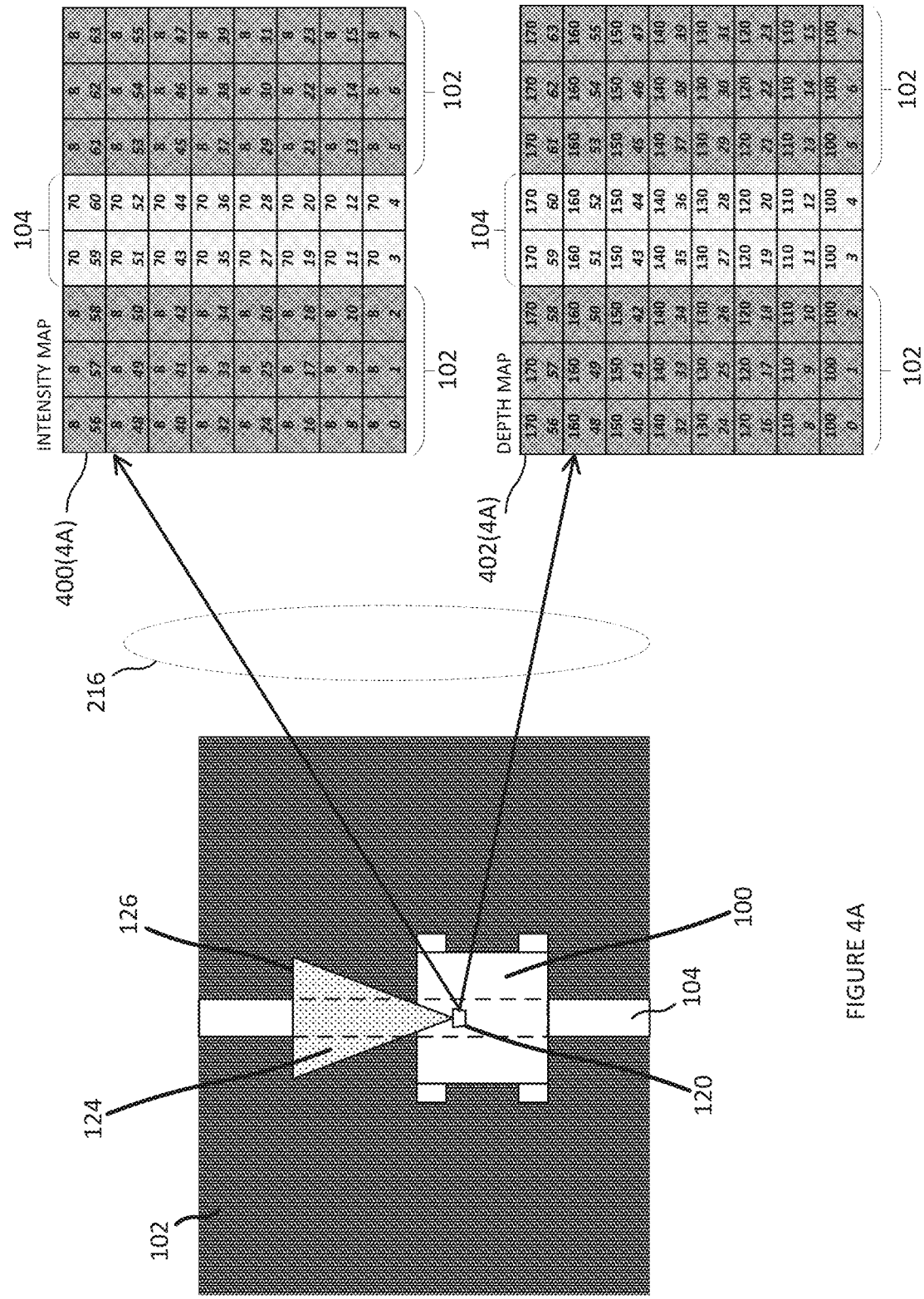
FIGS. 4A-4B illustrate top views of an example scenario in which a mobile robot is following a line and associated image information, according to certain embodiments of this disclosure.
Figure 4B:
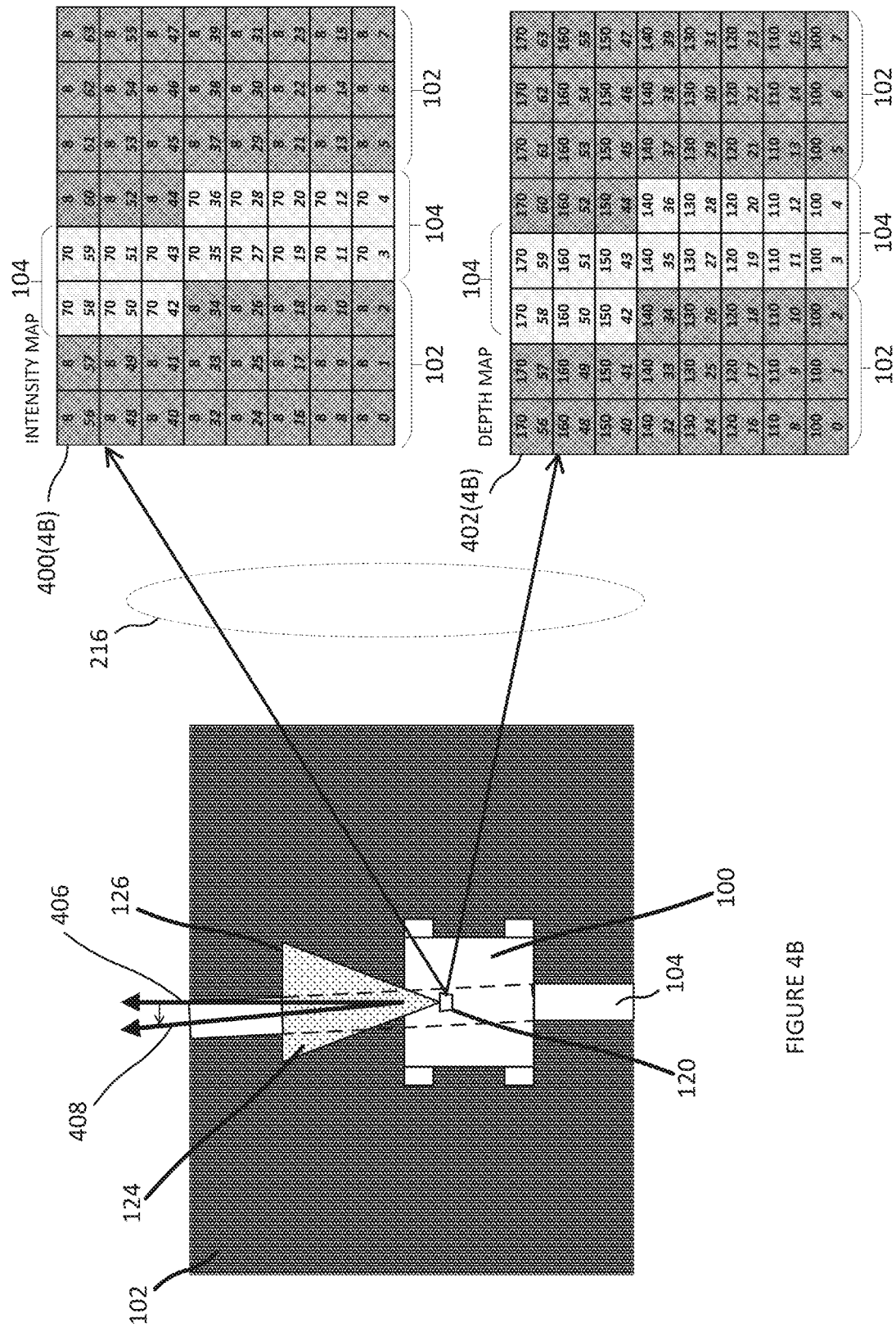

In one example in which line 104 has a width of two pixels and is intended to be centered under/in the movement path of robot 100, a two-pixel-wide column of pixels running from top-to-bottom of the intensity map may be expected to have respective intensity values indicative of line 104. FIGS. 4A-4B, described below, illustrate an example intensity map and associated intensity values and pixel locations. To determine whether the movement path of robot 100 has deviated (or will soon deviate) from the target movement path indicated by line 104, navigation control logic 306 includes instructions for analyzing the intensity map to determine which pixels have a corresponding intensity value indicative of line 104, and compare the identified pixels to the expected pixels. If one or more pixels that are expected to have intensity values indicative of line 104 do not have intensity values indicative of line 104, then navigation control logic 306 may determine that the movement path of robot 100 does not match the target movement path indicated by line 104. Additionally or alternatively, if one or more pixels that are expected not to have intensity values indicative of line 104 instead have intensity values indicative of line 104, then navigation control logic 306 may determine that the movement path of robot 100 does not match the target movement path indicated by line 104.

As one particular example analysis of the intensity values of image information 216 using an edge detection technique, and under the assumption that pixels corresponding to line 104 are expected to have higher intensity values than pixels corresponding to floor 102, navigation control logic 306 may implement a high pass filter to identify pixels that have intensity values associated with line 104. The high pass filter may be implemented as a threshold, and navigation control logic 306 may provide instructions for comparing the intensity values for each pixel of an intensity map to the threshold to determine whether the intensity value of that pixel exceeds the threshold, and if so, determine that line 104 is present at a location in the movement path of robot 100 that corresponds to that pixel.

Additionally or alternatively, other types of filters could be used, such as a low pass filter that is used to identify pixels having an intensity value associated with floor 102. Furthermore, in an example in which floor 102 has a higher reflectivity than line 104, the above scenario could be reversed such that a low pass filter is used to identify pixels having an intensity value less than a predetermined threshold.

Turning to an analysis of the distance values of image information 216, in certain embodiments to determine whether to modify a movement path of robot 100, processor 302 determines whether a depth map indicates the presence of an obstacle, such as an obstruction 116 or cliff 118 in field of view 126 of image sensor 120 (and thereby in the movement path of robot 100). In certain embodiments, determining, according to the distance values, that an obstacle is detected includes determining that a distance value for a particular pixel meets a predetermined condition.

When robot 100 is moving in a movement path that follows line 104 on floor 102 with no obstacles, other than minor variations in distance values due to minor defects or the like in floor 102 or line 104, depth map typically would show distance values that are substantially the same across a given row of pixels in a depth map, that generally increase from row to row (and likely increase by a generally consistent amount from row to row), and that (for a given pixel) remain generally the same from depth map to depth map as new instances of image information 216 are obtained. Given these considerations, processor 302 may evaluate a depth map itself to determine whether the depth map indicates the presence of an obstacle in field of view 126 of image sensor 120 and/or may compare a depth map to one or more previous depth maps to determine whether the depth map (relative to the prior depth maps) indicates the presence of an obstacle in field of view 126 of image sensor 120.

Considering the current depth map itself, processor 302 may compare the distance values for pixels in a row of pixels in the depth map to distance values for corresponding pixels in an adjacent row of pixels in the depth map to determine whether the values differ by an expected amount. If the distance value for a particular pixel in one row of pixels differs from a distance value of a corresponding pixel in an adjacent row of pixels by more than an expected amount (potentially indicating a cliff 118) or less than an expected amount (potentially indicating an obstruction 116), then processor 302 may identify that one or both of those pixels are associated with an obstacle. In certain embodiments, the expected amount is designed to allow some flexibility for detection of obstacles that are unlikely to hinder movement of robot wo along the movement path. For example, an upper threshold and a lower threshold may be defined to define a band of allowable differences between the distance value for a particular pixel in one row of pixels and a distance value of a corresponding pixel in an adjacent row of pixels.

Considering the current depth map and one or more previous depth maps, processor 302 may compare a current depth map of image information 216 to one or more prior depth maps to determine whether an obstacle may be present in field of view 126 of image sensor 120 (and thereby in the movement path of robot 100). For example, when comparing a current depth map to a prior depth map, processor 302 may compare the distance values for pixels in a row of pixels in the current depth map to distance values for corresponding pixels in the corresponding (e.g., same) row of pixels in the prior depth map to determine whether the values are the same or similar within a defined range of difference values. If not, then processor 302 may conclude that this change of values indicates the likely presence of an obstacle at those pixel locations. If the values are the same (or differ within the define range of difference values), then processor 302 may analyze the current depth map itself (e.g., using the technique described above) and/or may compare the current depth map to one or more additional prior depth maps for further data points.

Additionally, navigation control logic 306 may learn over time an expected distance to floor 102 and/or line 104 (values which, in certain embodiments, are substantially the same) for each pixel. Whether analyzing the depth map itself or comparing the current depth map to one or more previous depth maps, processor 302 may consider the expected distance value for a given pixel when determining whether or not the distance value of the given pixel indicated by a current depth map matches or is within the expected distance value.

In certain embodiments, navigation control logic 306 is capable of identifying an intersection of lines 104, such as shown at intersection portion 114 in FIG. 1B. An intersection could be a four-way intersection (e.g., as shown at intersection portion 114), a t-shaped intersection (where one line 104 dead-ends into another ongoing line 104), or have any suitable number of intersecting lines 104. In certain embodiments, navigation control logic 306 may detect the intersecting lines using intensity information and confirm that the intersecting lines 104 (which appear in pixels other than the pixels in which the line 104 that robot 100 currently is following are expected to appear) are not obstacles because the pixels in which the intersecting lines 104 appear would have distances values consistent with a lack of obstacles. When an intersection is detected using the image information 216 provided by image sensor 120, navigation control logic 306 may include further logic for determining whether to continue the movement path on the current line 104 or to turn onto another movement path of an intersection line 104.

In certain embodiments, as part of analyzing image information 216 or prior to storing image information 216 in memory 304, processor may perform pre-processing of image information 216. Such pre-processing may include noise reduction processing or other suitable types of pre-processing.

Navigation control logic 306 may include instructions for initiating, in response to determining according to image information 216 to modify the movement path of robot 100, sending of a command 310 to drive subsystem 308 to modify the movement path of robot 100.

In certain embodiments, processor 302 selects a command 310 that will accomplish one or more of the following when modifying a movement path of robot 100: line following (e.g., returning robot 100 to the target movement path indicated by line 104) when the analysis of image information 216 indicates that the movement path of robot 100 has deviated from (or soon will deviate from) the target movement path indicated by line 104; obstacle avoidance when the analysis of image information 216 indicates that an obstacle (e.g., obstruction 116 or cliff 118) is in the movement path of robot 100; or both.

Command 310 may be one command or a combination of commands, and may include one or more of a command to modify a velocity at which robot 100 is moving, a command to modify a movement path of robot 100 (e.g., a command to turn or a command to reverse directions), a command to stop, or any other suitable command. In a case in which command 310 includes a command to turn, command 310 may indicate an amount by which robot 100 should turn (e.g., in degrees or with a representative value for particular predetermine turn amounts).

Drive subsystem 308 is configured to provide the propulsion and steering mechanism of robot 100. For example, drive subsystem 308 may include motors, engines, actuators, axles, wheels, and other suitable components to effectuate propulsion and steering of robot 100. The particular components of drive subsystem 308 may depend on the type of mobility used by robot 100. In an example in which robot 100 is a flying drone, drive subsystem 308 may include one or more propellers, one or more rudders, and the like, and might or might not also include components for movement on the ground, such as wheels and associated axles.

Drive subsystem 308 is configured to receive commands 310 from processor 302 and act on those commands 310 to control movement of robot 100 according to the received commands. For example, if a received command 310 instructs drive subsystem 308 to turn robot 100, drive subsystem 308 may cause a steering mechanism to turn in a desired direction by a specified or otherwise predetermined amount to thereby cause robot 100 to turn in the desired direction and modify a movement path of robot 100. As another example, if a received command 310 instructs drive subsystem 308 to stop movement of robot 100 along the current movement path of robot 100, drive subsystem 308 may cause a propulsion mechanism of robot 100 to stop moving robot 100. In certain embodiments, drive subsystem 308 provides feedback 312 to processor 302, which may include confirmation of receipt of a command 310, status information regarding implementation of command 310, or any other suitable information.

Power system 300 may include any suitable components that are capable of supplying power to robot 100. For example, power system 300 may include any suitable combination of one or more batteries; electrical, solar, and/or gas powered motors/engines; or any other suitable type of components or combination of components for providing power to robot 100.

The particular classification and arrangement of elements shown in FIG. 3 is for example purposes only. For example, various components shown to be part of navigation control system 122 might or might not be considered part of navigation control system 122 for a given implementation. In certain embodiments, processor 302 and memory 304 are not limited to their roles within navigation control system 122 and provide other suitable functions for robot 100. Although shown as being part of robot 100, in certain embodiments, one or more components of navigation control system 122 may be located remotely from robot 100 and may communicate through an appropriate wired or wireless connection to robot 100. As just one example, image sensor 120 may be located on robot 100 and image information 216 provided by image sensor 120 may be communicated to a remote computer system (physically distinct from robot 100) that analyzes image information 216 and determines commands to be provided to drive subsystem 308 located on robot 100.

FIGS. 4A-4B and FIGS. 5-8 illustrate example scenarios and associated operation of robot 100 using image information 216, according to certain embodiments of this disclosure. In particular, each of these figures illustrates an example scenario in which robot 100 is following one or more lines 104 along floor 102, and the associated image information 216 that may be provided by image sensor 120 for that scenario.

FIGS. 4A-4B illustrate top views of an example scenario in which mobile robot 100 is following line 104 and associated image information 216, according to certain embodiments of this disclosure.

As illustrated in FIG. 4A, robot 100 is following a portion of line 104 that is generally straight. For purposes of this example, it will be assumed that a goal of a line-following algorithm implemented by navigation control logic 306 is to maintain line 104 generally centered under robot 100 and, given the centrally-located position of image sensor 120 on robot 100, generally centered within field of view 126 of image sensor 120. Other implementations are possible.

As shown in FIG. 4A, image information 216 for the scenario shown in FIG. 4A includes intensity map 400 and depth map 402. For purposes of this description, an intensity map may be referred to generally as intensity map 400 and a depth map may be referred to as depth map 402. To distinguish the intensity maps 400 shown in FIGS. 4A-4B and FIGS. 5-8 when referring to a particular intensity map 400 shown in one of these figures, references to intensity map 400 may be followed by a parenthetical that includes the appropriate figure number (e.g., 400 (4A), 400 (4B), 400 (5), 400 (6), 400 (7), or 400 (8)). A similar convention is adopted for depth maps 402.

The particular example intensity maps 400 and depth maps 402 shown in FIG. 4A-4B and FIGS. 5-8 include an 8×8 matrix of pixels, for a total of sixty-four pixels. The pixels are numbered from zero (in the lower left corner) to 63 (in the upper right corner). Other implementations may have other numbers of pixels depending on the particular implementation of image sensor 120, including the particular implementation of detector array 214 and the sampling technique used by image processor 204 for obtaining and processing values from detector array 214.

For both intensity map 400 and depth map 402, each cell specifies a pixel identifier (e.g., 0-63, as shown by the bottom number in each cell). The pixel identifier indicates a location (or coordinate) within intensity map 400 or depth map 402, and that location corresponds to physical location with the portion of scene 210 captured by image sensor 120 (within the field of view of image sensor 120). Furthermore, it should be understood that intensity map 400 and depth map 402 illustrate just one way of representing the intensity values and distance values included in image information 216.

In this example, both intensity values and distance values are captured at a same resolution, so both intensity map 400 and depth map 402 include the same number of pixels (sixty-four in this example), which for purposes of intensity map 400 and depth map 402, also may be thought of as cells of the map. Thus, the pixels of intensity map 400 have a one-to-one correspondence with the pixels of depth map 402 such that corresponding pixels in intensity map 400 and in depth map 402 indicate a same pixel (location) within the captured image of a portion of a scene in field of view 126 of image sensor 120.

Each pixel in intensity map 400 also includes an intensity value (as shown by the top number in each pixel). The intensity value shown in intensity map 400 for a given pixel indicates the reflected radiation 213 captured by a photodetector of detector array 214 that captured the image information 216 for that cell. Intensity map 400 may be analyzed to distinguish objects in the portion of a scene (e.g., scene 210) captured by image sensor 120. Of particular relevance to the line-following aspect of navigation control logic 306, the intensity values of intensity map 400 may be used to distinguish line 104 from floor 102. Choosing a material for line 104 with characteristics (e.g., color and/or another property) that will have different (and potentially significantly different) intensity values than floor 102 can assist processor 302 in distinguishing line 104 from floor 102, and thereby determining a location of line 104 in intensity map 400.

Processor 302 may analyze image information 216 (including intensity map 400 and depth map 402) to determine a current position of robot 100 relative to line 104. In this scenario, processor 302 determines that line 104 is in the desired position (in this example centered within the field of view of image sensor) such that robot 100 is adequately following line 104.

Based on a desired position of line 104 in the movement path of robot 100 and in the field of view 126 of image sensor 120, certain pixels of intensity map 400 may be predetermined to be acceptable locations for detecting the presence of line 104 based on the intensity value of that pixel. Processor 302 may determine, based on the intensity values of intensity map 400, whether line 404 occupies the pixels that line 404 is expected to occupy (in this case, a central 2×8 set of pixels, including pixels 3-4, 11-12,19-20, 27-28, 35-36, 43-44, 51-52, and 59-60) in any number of ways.

In certain embodiments, to analyze image information 216 to determine a current position of robot 100 relative to line 104, processor 302 may perform an edge detection analysis on image information 216, including on the intensity values and the distance values, as described above. For example, processor 302 may pass the intensity values and the distance values through a filter (e.g., a high-pass filter or a low-pass filter) to determine which values of the intensity map and the depth map meet certain conditions. Because in this example line 104 has a higher intensity value than floor 102, processor 302 may determine which pixels of intensity map 400 (4A) correspond to line 104 by applying a high pass filter that has a threshold value of 60, for example. The pixels associated with floor 102 (which show an intensity value of 8) would not pass this high pass filter, and the pixels associated with line 104 would pass this high pass filter. In this way, using intensity map 400 (4A), processor 302 could determine which pixels of intensity map 400 (4A) correspond to line 104.

For purposes of this example, line 104 has a greater intensity than floor 102; however, the reverse could be true. For example, line 104 could be a darker color and floor 102 could be a lighter color. Adjustments could be made to the above detection technique, if appropriate. For example, a low pass filter could be used to identify pixels at which the line is detected.

Regarding the particular intensity and distance values shown in intensity map 400 (4A) and depth map 402 (4A), distance values in depth map 402 are consistent across each row, potentially indicating that no obstacle is detected. For example, pixels 0-7 each have an associated depth value of 100 millimeters, pixels 8-15 each have an associated depth value of no millimeters (which is greater than the depth values of pixels 0-7 due to the portion of the captured scene corresponding to pixels 8-15 being further away from image sensor 120 than the portion of the captured scene corresponding to pixels 0-7), and so on. In certain embodiments, processor 302 can further confirm this conclusion by comparing a current depth map 402 (4A) to one or more previously-captured depth maps 402 to determine whether the distance values remain generally consistent over time, as should be the case if image sensor 120 is only detecting floor 102 and line 104 without detecting an obstacle (e.g., an obstruction 116 or cliff 118).

In general, intensity map 400 can be used to determine a location of line 104 and a suitable responsive action, if appropriate, and depth map 402 can be used to determine whether an obstacle is present and determine a suitable responsive action, if appropriate. This disclosure, however, contemplates using either or both of intensity map 400 and depth map 402 for determine either of line following and/or obstacle detection/avoidance.

FIG. 4B illustrates a scenario in which line 104 is no longer centered within field of view 126 (e.g., within intensity map 400 (4B)), indicating that robot 100 is no longer (or soon will not be) following line 104, as desired. Processor 302 processes image information 216 and determines, based on intensity map 400 (4B) that line 104 is present in pixels that are not centered within intensity map 400. In the illustrated example, the intensity values for pixels 42, 50, and 58 now indicate that line 104 is detected in those pixel locations, and the intensity values for pixels 44, 52, and 60 now indicate that line 104 is no longer detected in those pixel locations. Processor 302 may determine this scenario by filtering the intensity values of intensity map 400 to determine the pixels at which line 104 is detected.

In this scenario, processor 302 determines that line 104 is now present on the left of the target path and determines an appropriate responsive action, which in one example includes initiating sending of a command to drive subsystem 308 to turn robot to the left by a predetermine amount and/or for a predetermined time. This action will cause robot to move from its current movement path 406, which does not align with line 104, to the target movement path 408, which aligns with line 104.

[ono] As with FIG. 4A, the distance values of depth map 402 (4B) are consistent across each row, potentially indicating that no obstacle is detected, and processor 302 can further confirm this conclusion by comparing a current depth map 402 (4B) to one or more previously-captured depth maps 402 to determine whether the distance values remain generally consistent over time, as should be the case if image sensor 120 is only detecting floor 102 and line 104 with detecting an obstacle (e.g., an obstruction 116 or cliff 118).

It should be understood that the thresholds for determining which pixels have intensity values for line 104 and the identification of which pixels are expected to have intensity values for line 104 can be adjusted to provide some flexibility, if desired. For example, although line 104 might be expected to occupy the a 2×8 center column of pixels (as is the case in the example of FIGS. 4A-4B), navigation control logic 306 may specify that a center column of 3×8 is acceptable without issuing a command to modify a movement path of robot 100. This may reduce instances of robot 100 responding to minor variations in line 104, for example.

Furthermore, the determination of an appropriate command also may be based on which pixels that are not expected to show intensity values consistent with line 104 now show intensity values consistent with line 104. For example, navigation control logic 306 may specify that if pixels to the left of the expected set of pixels for line 104 (e.g., the center 2×8 column of pixels) have values consistent with line 104, then a command for robot 100 to turn left should be issued. As another example, navigation control logic 306 may specify that if pixels to the right of the expected set of pixels for line 104 (e.g., the center 2×8 column of pixels) have values consistent with line 104, then a command for robot 100 to turn right should be issued. Additional and/or more complex rule sets for determining an appropriate command are possible.

Figure 5:
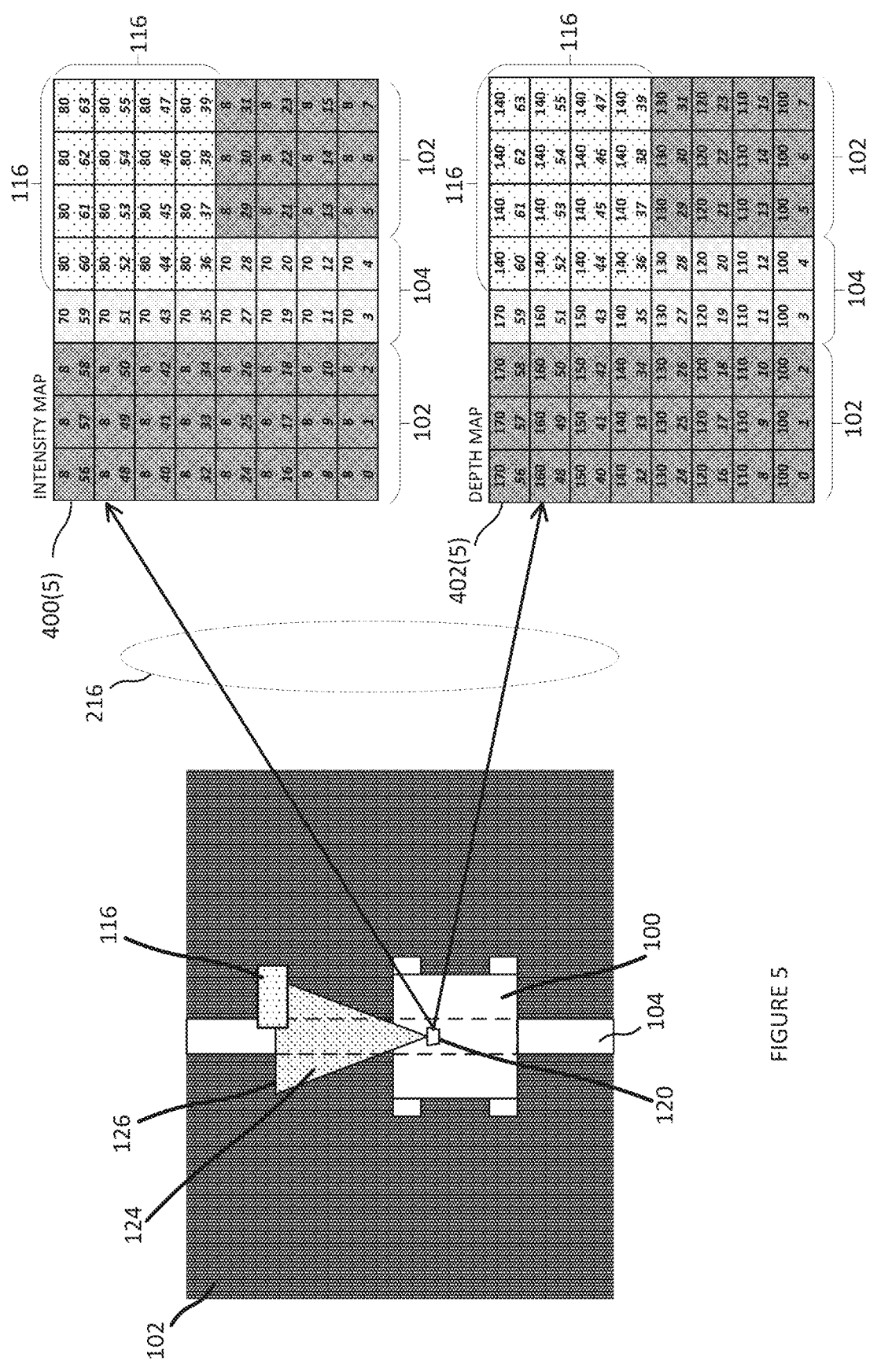

FIG. 5 illustrates a top view of an example scenario in which mobile robot 100 is following line 104 and an obstacle (e.g., obstruction 116) is detected, along with associated image information 216, according to certain embodiments of this disclosure. The description of FIG. 4A is incorporated by reference, as robot 100 is generally in a state relative to line 104 similar to the state described above with reference to FIG. 4A.

In FIG. 5, however, an obstruction 116 is present and detected within field of view 126 of image sensor 120, indicating that obstruction 116 is in a current movement path of robot 100. The presence of obstruction 116 is indicated by both in intensity map 400 and depth map 402.

Considering intensity map 400 (5), pixels 36-39, 44-47, 52-55, and 60-63 include respective intensity values of 80. Processor 302 may detect that pixels that are expected to have intensity values for floor 102 have intensity values that pass a high pass filter for identifying pixels having intensity values associated with line 104. Depending on the analysis mechanism used, however, processor 302 might or might not detect the different intensity values of pixels 36-39, 44-47, 52-55, and 60-63 (having intensity values of 80 associated with obstruction 116) relative to the intensity values of pixels 3-4, 11-12, 19-20, 27-28, 35, 43, 51, and 59 (having intensity values of 70 associated with line 104). For example, if a high pass filter is used to identify pixels having an intensity greater than 60, for example, then pixels associated with obstruction 116 and the pixels associated with line 104 would pass such a filter. More sophisticated edge detection algorithms could be used to identify pixels of intensity map 400 (5) in a way that can more specifically identify pixels that include an intensity value associated with line 104.

Turning to depth map 402 (5), certain pixels include distances that are shorter than other pixels in a same row, indicating the presence of some object in a location corresponding to those pixels. For example, pixels 40-43 include distance values of iso, while pixels 44-47 include distance values of 140 (which, in this example, also is the same as distance values of pixels 36-39, which are "closer" to image sensor 120 within field of view 126). As another example, pixels 48-51 include distance values of 160, while pixels 52-55 include distance values of 140 (which, in this example, also is the same as distance values of pixels 36-39 and pixels 44-47, which are "closer" to image sensor 120 within field of view 126). As another example, pixels 56-59 include distance values of 170, while pixels 60-63 include distance values of 140 (which, in this example, also is the same as distance values of pixels 36-39, pixels 44-47, and pixels 52-55, which are "closer" to image sensor 120 within field of view 126).

In analyzing depth map 402 (5), processor 302 may compare the distance values of the current depth map 402 (5) with the distance values of one or more previous depth maps 402 (5) to determine whether a distance value has changed, indicating the presence of an obstacle (e.g., obstruction 116). For example, processor 302 may store the previous depth map 402 and determine whether any distance values in the current depth map 402 (5) deviate by a threshold amount from distance value of a corresponding pixel of the previous depth map 402. As another example, processor 302 may store a reference depth map 402 that includes a running average of the previous X depth maps 402, and determine whether any distance values in the current depth map 402 (5) deviate by a threshold amount from the running average in a corresponding pixel of the reference depth map 402.

Figure 6:
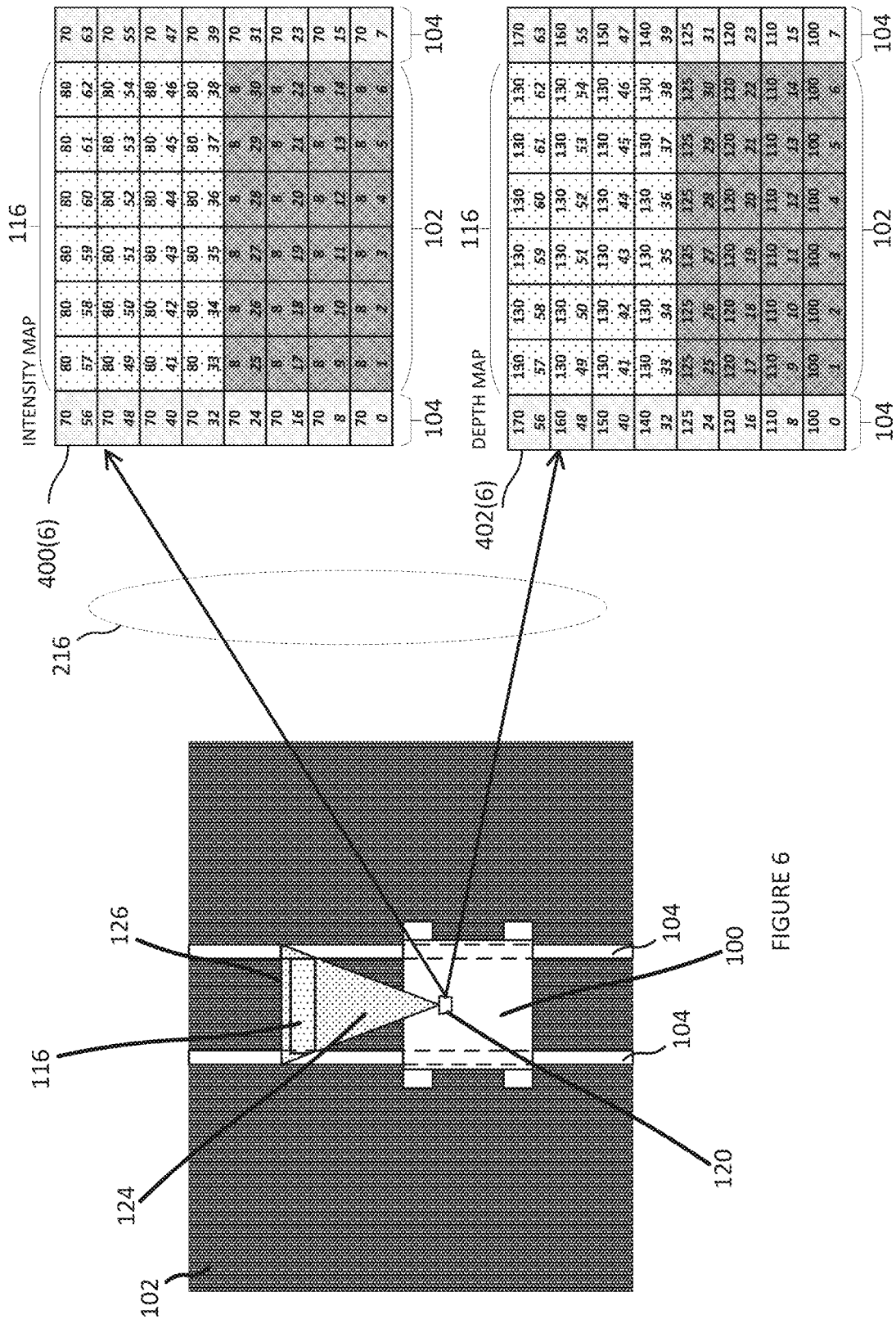
FIG. 6 illustrates a top view of an example scenario in which a mobile robot is following two parallel lines and an obstacle (e.g., an obstruction) is detected, along with associated image information, according to certain embodiments of this disclosure.

FIG. 6 illustrates a top view of an example scenario in which mobile robot 100 is following two parallel lines 104 and an obstacle (e.g., obstruction 116) is detected, along with associated image information 216, according to certain embodiments of this disclosure.

In this example, pixels of intensity map 400 (6) that are expected to have intensity values associated with line 104 are no longer the center pixels, but instead are located toward the left and right edges of intensity map 400 (6). Obstruction 116 may be detected in a similar manner to that described above with reference to FIG. 5, and the details are not repeated. In certain embodiments, the ability to detect and follow these multiple lines, as well as the ability to detect obstruction 116, is provided based on image information 216 captured by a single image sensor 120.

Figure 7:
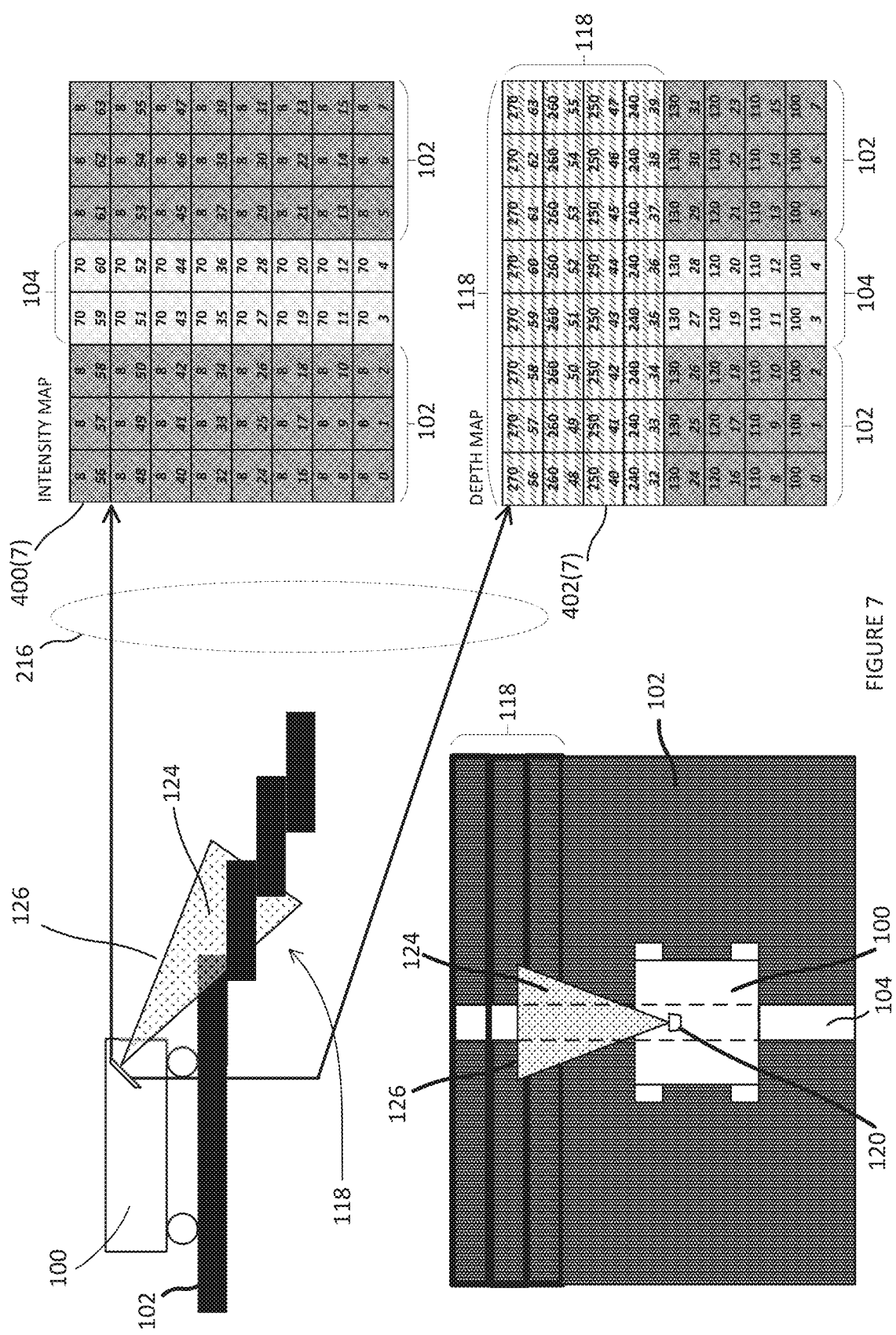
FIG. 7 illustrates cross-sectional and top views of an example scenario in which a mobile robot is following a line and an obstacle (e.g., a cliff) is detected, along with associated image information, according to certain embodiments of this disclosure.

FIG. 7 illustrates cross-sectional and top views of an example scenario in which mobile robot 100 is following a line 104 and an obstacle (e.g., cliff 118) is detected, along with associated image information 216, according to certain embodiments of this disclosure.

Navigation control system 122 may identify cliff 118 in much the same way as was described previously with detection of obstruction 116 with reference to FIG. 5; however, the obstacle in FIG. 7 (cliff 118) is identified through distance values that are greater than expected rather than closer than expected (as was the case with obstruction 116 of FIG. 5).

In certain embodiments, navigation control logic 306 provides an ability to prioritize line following or obstacle avoidance. Taking the example in FIG. 7, line 104 continues down cliff 118 (down the stairs). If obstacle avoidance is prioritized, then navigation control system 122 may control robot 100 to avoid cliff 118 even if doing so causes a movement path of robot 100 to deviate from line 104. Alternatively, the command issued by navigation control logic 306 to drive subsystem 308 may specify that robot 100 should stop. If, on the other hand, line following is prioritized, then navigation control system 122 may control robot 100 to continue following line 104 and proceed down the stairs, which may be acceptable in some implementations (e.g., if robot 100 is constructed to traverse stairs or if robot 100 is implemented as a flying object, such as a drone). Alternatively, the command issued by navigation control logic 306 to drive subsystem 308 may specify that robot 100 should stop, which stops robot 100 from changing the movement path from line 104 and also avoids cliff 118.

Figure 8:
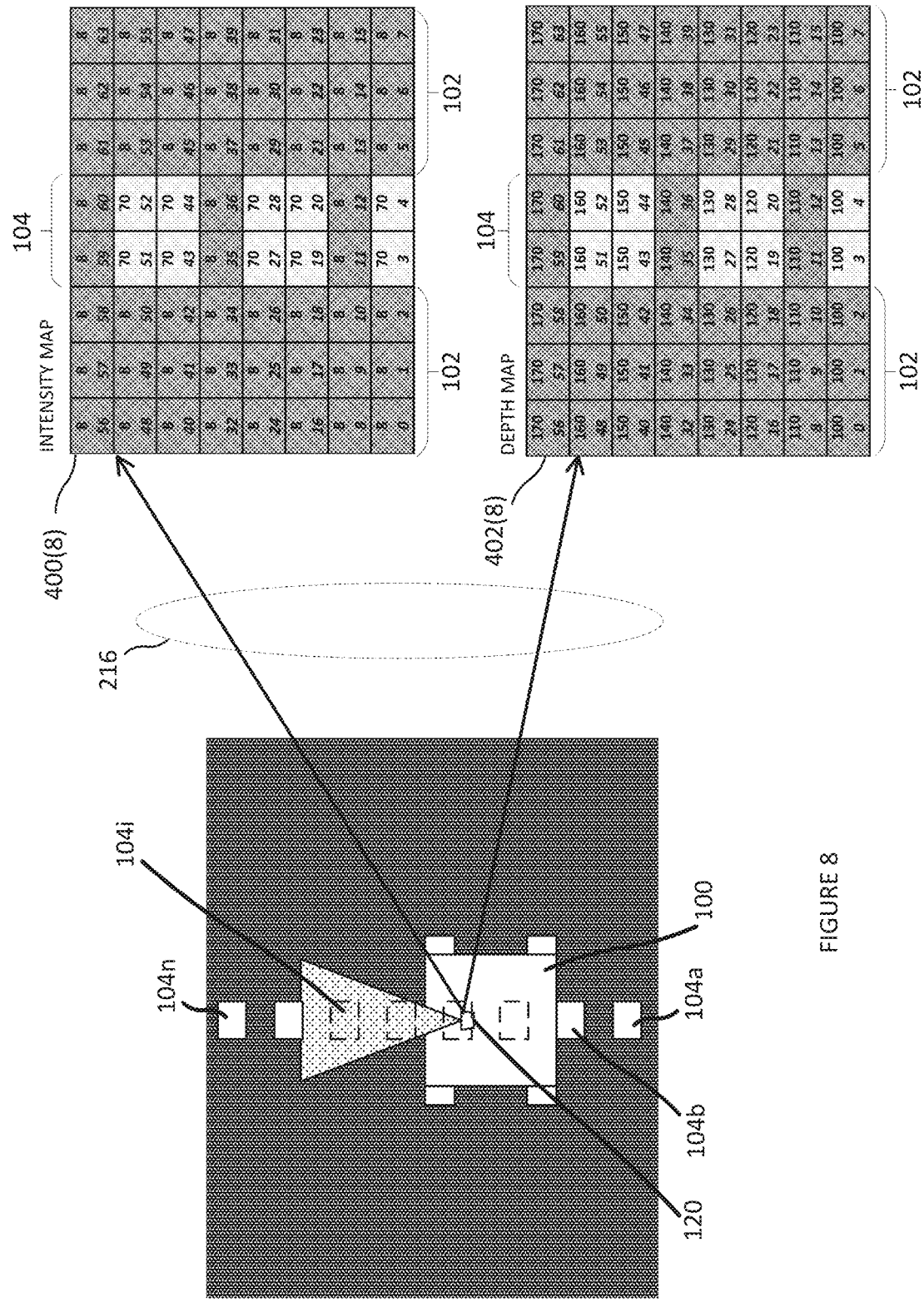
FIG. 8 illustrates top views of an example scenario in which mobile robot is following a line that is segmented into line portions that can be used to estimate a velocity of the mobile robot, along with associated image information, according to certain embodiments of this disclosure.

FIG. 8 illustrates top views of an example scenario in which mobile robot 100 is following a line 104 that is segmented into line portions that can be used to estimate a velocity of mobile robot 100, along with associated image information 216, according to certain embodiments of this disclosure. In certain embodiments, navigation control logic 306 provides the instructions that cause processor 302 to perform velocity calculations.

Velocity of an object, of course, may be estimated using the formula average velocity equals change in distance divided by change in time. As shown in FIG. 8, line 104 is formed of multiple line segments separated by gaps. To avoid overcrowding of FIG. 8, only a few of these line segments (line segment 104a, line segment 104b, line segment 104i, and line segment 104n) are labeled.

The inclusion of both intensity values and distance values in image information 216 may allow processor 302 to estimate the average velocity of robot 100. For example, processor 302 may identify distinct line segments of line 104 based on the intensity values of image information 216 and given that line segments of line 104 are separated by gaps that would have intensity values associated with floor 102, and may track the movement of line segments of line 104 through pixels using multiple intensity maps 400 (8) over time. The depth map 402 (8) of image information 216 would also include distance values that correspond to a distance of those line segments of line 104 from image sensor 120, and processor 302 may use the distance values, along with the associated sampling times, to estimate the velocity of robot 100.

For example, processor 302 may detect, according to the intensity values, a first line segment (1040 at a first time, the first line segment (1040 associated with a first distance according to the distance values. Processor 302 may detect, according to updated intensity values, the first line segment (1040 at a second time, the first line segment (1040 associ- ated with a second distance according to updated distance values. Processor 302 may calculate a velocity of the robot based on the first distance, the second distance, the first time, and the second time.

In certain embodiments, processor 302 may calculate multiple velocity estimates over a short period of time (and/or for multiple line segments of line 104) and then calculate an average of those multiple velocity estimates to arrive at a final estimated velocity. Processor 302 may perform these calculations on continuous rolling basis or at any suitable interval.

Figure 9:
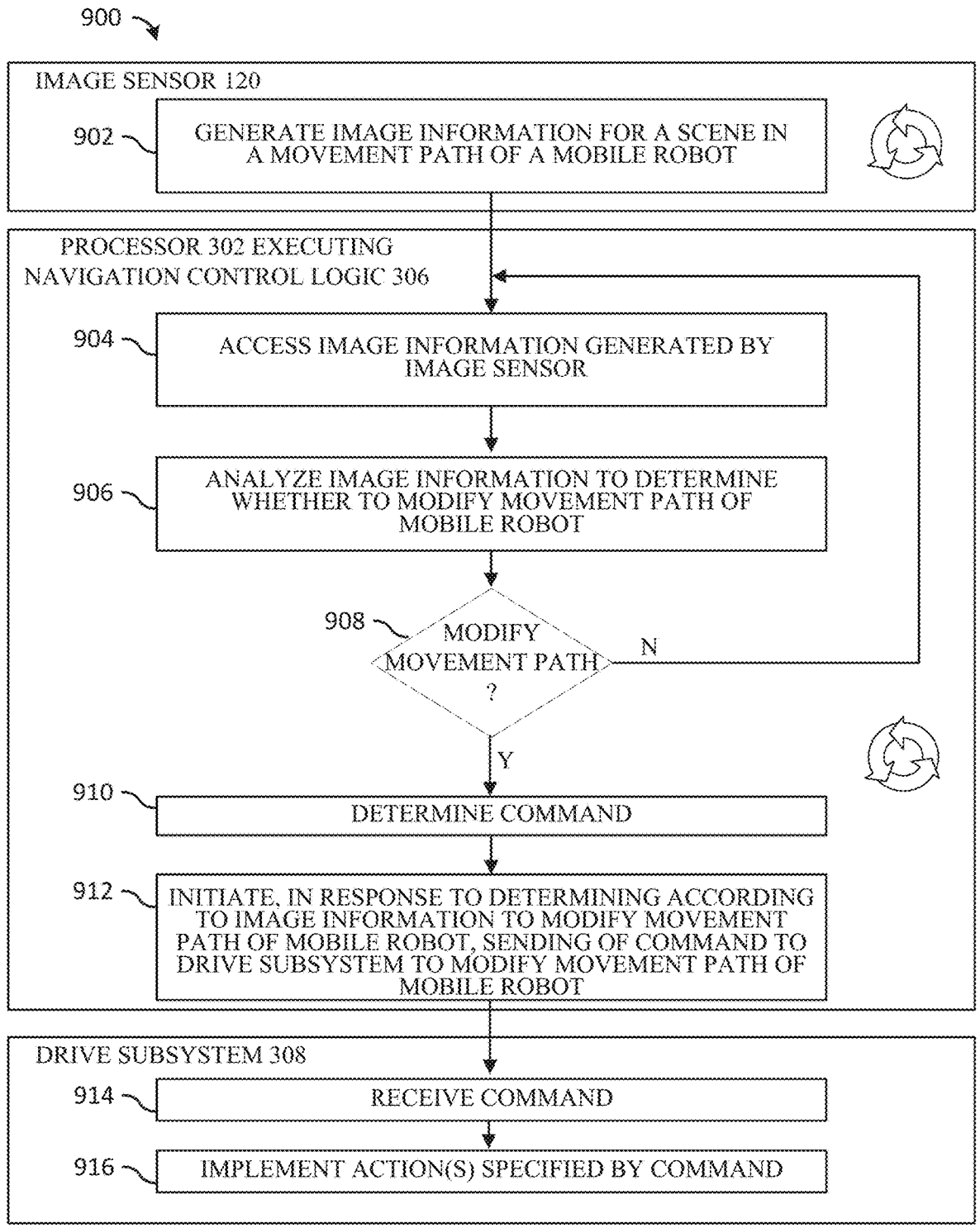
FIG. 9 illustrates an example method for controlling movement of mobile robot, according to certain embodiments of this disclosure.

FIG. 9 illustrates an example method 900 for controlling movement of mobile robot 100, according to certain embodiments of this disclosure.

At step 902, image sensor 120 generates image information 216 for a scene 210 in a movement path of robot 100. For example, image sensor 120 may generate image information 216 for portions of a scene 210 that fall within a field of view 126 of image sensor 120. Image information 216 may include intensity values and distance values for each of a plurality of pixels in an image of the portion of scene 210. For example, the intensity values and distance values may provide an intensity map 400 and depth map 402, respectively, of the portion of scene 210. As shown by the circular arrow, image sensor 120 may repeatedly perform step 902 at a suitable interval, so that additional images of the scene 210 in the movement path of robot 100 may be captured as robot 100 moves along the movement path.

At step 904, processor 302, executing navigation control logic 306, accesses image information 216 generated by image sensor 120. For example, processor 302 may access images information 216 stored in memory 304, request and receive image information 216 from image sensor 120, access image information 216 from memory 206 of image sensor 120, or otherwise obtain image information 216.

At step 906, processor 302 analyzes image information 216 to determine whether to modify a movement path of robot 100. As described above, this analysis may include pre-processing (noise detection), edge detection or another suitable type of threshold-based analysis, comparisons of image information 216 to historical image information 216, or any other suitable type of analysis. Furthermore, processor 302 may analyze intensity values (e.g., intensity map 400), distance values (depth map 402), or both.

At step 908, processor 302 determines whether to modify a movement path of robot 100 based at least in part on the analysis performed at step 908. Although described separately, in certain embodiments, steps 906 and 908 may be performed as part of the same analysis. If processor 302 determines at step 908 not to modify the movement path of robot 100, then processor 302 returns to step 904 to access new image information 216. If processor 302 determines at step 908 to modify the movement path, then the method proceeds to step 910.

For example, processor 302 may analyze image information 216 to facilitate robot 100 in following a target movement path (e.g., line 104), and may determine that the movement path of robot 100 has deviated from target movement path (e.g., line 104). The movement path of robot 100 may deviate from the target movement path (e.g., line 104) for a variety of reasons. For example, the target movement path (e.g., line 104) may include a change of direction, such as a sharp turn, a curve, or another suitable change of direction. As another example, the movement path of robot 100 may drift from the target movement path due to an alignment problem of wheels 108 of robot 100, a slope of floor 102, or for any other suitable reason.

As a particular example, a target movement path of robot 100 may be line 104 on floor 102. In certain embodiments, determining according to image information 216 to modify the movement path of robot 100 includes determining, according to the intensity values (of image information 216), that the movement path of robot 100 has deviated from the target movement path (e.g., line 104) of robot 100 in a first direction (e.g., the movement path of robot 100 is to the right of the target movement path (line 104). In such an example, command 310 may include an instruction to drive subsystem 308 to turn robot 100 in a second direction (e.g., to the left in this example) to align the movement path of robot 100 with the target movement path (line 104). In certain embodiments, determining, according to the intensity values, that the movement path of robot 100 has deviated from the target movement path (e.g., line 104) in the first direction may include determining that an intensity value for a particular pixel meets a predetermined condition. As just one example, the predetermined condition may include whether an intensity value for the particular pixel passes a high pass filter (e.g., exceeds a predetermined threshold).

As another particular example, in certain embodiments, determining according to image information 216 to modify the movement path of robot 100 includes determining, according to the distance values (of image information 216), that an obstacle (e.g., obstruction 116 or cliff 118) is detected. In certain embodiments, determining, according to the distance values, that an obstacle is detected includes determining that a distance value for a particular pixel meets a predetermined condition. As just one example, the predetermined condition may include whether a distance value for the particular pixel is greater than or less than an expected distance. In certain embodiments, the command for a scenario in which an obstacle is detected includes an instruction to drive subsystem 308 to steer robot 100 to avoid the obstacle or an instruction to drive subsystem 308 to stop robot 100.

At step 910, processor 302 determines a suitable command 310 for modifying a movement path of robot 100 in a desired manner. Command 310 may include a single command or multiple commands. In certain embodiments, command 310 is intended to correct the movement path of robot to again align with the target movement path (e.g., line 104), to avoid a detected obstacle in the movement path of robot 100, or a combination of these. Processor 302 may attempt to cause robot 100 to swerve around a detected obstruction 116. In such a scenario, navigation control logic 306 may include instructions that temporarily allow greater flexibility in the expected detected pixels for detecting line 104, potentially with the caveat that image sensor 120 still be able to detect at least one line 104 (though of course other approaches may be implemented).

As a particular example, processor 302 may relax (or further relax) the goal of having line 104 centered within the field of view of image sensor 120 as long as line 104 is still detectable within the field of view of image sensor 120 to allow robot 100 to attempt to swerve around the detected obstruction 116. In response to processor 302 no longer detecting obstruction 116, processor 302 may again tighten the expected position of line 104 within field of view 126 of image sensor 120. If robot 100 is unable to swerve around obstruction 116 without completely departing from line 104, then processor 302 may subsequently issue a command for drive subsystem 308 to cause robot 100 to stop. Of course, this disclosure contemplates using any suitable algorithm for negotiating these or other complex scenarios, and such algorithms may allow robot 100 to temporarily depart completely from line 104 to perform obstacle avoidance and then return to line 104 in response to processor 302 determining that the image information 216 no longer shows the presence of the obstacle.

At step 912, processor 302 initiates, in response to determining according to image information 216 to modify the movement path of robot 100, sending of a command 310 to drive subsystem 308 to modify the movement path of robot 100. Processor 302 may send command 310, or may cause another component to send the command.

As shown by the circular arrow, processor 302 may repeatedly perform steps 904-912 to continue to evaluate whether to modify a movement path of robot 100 as new image information 216 is available (or at another suitable interval).

At step 914, drive subsystem 308 receives command 310. At step 916, drive subsystem 308 causes the action(s) specified by command 310 to be implemented, such as by controlling suitable components of robot 100 to cause robot 100 to turn, controlling suitable components of robot 100 to cause robot 100 to change speeds, controlling suitable components of robot 100 to cause robot 100 to stop, or by controlling suitable components of robot 100 to cause robot 100 to perform any suitable action.

Embodiments of this disclosure may provide some, none, or all of the following technical advantages. In certain embodiments, robot 100 includes an image sensor 120 configured to provide both intensity and distance measurements for multiple pixels of a scene captured by image sensor 120. For example, image sensor 120 may be a self-contained IC package that can provide these capabilities. The ability of a single image sensor 120 to capture both intensity values and distance values may reduce a number of sensors provided on a robot (e.g., robot 100) to obtain these values. Furthermore, the ability in certain embodiments of a single image sensor 120 to capture both intensity values and distance values across multiple pixels, or zones, of a scene also may contribute to reducing a number of sensors provided on a robot (e.g., robot 100) to obtain these values.

Additionally, the ability of image sensor 120 to provide both intensity values and distance values for multiple pixels of a scene may provide navigation control system 122 with both a multi-pixel intensity map and a multi-pixel depth map of a scene that navigation control system 122 can use to control movement of robot 100. For example, navigation control system 122 may use the multi-pixel intensity map 400 and the multi-pixel depth map 402 of the scene to perform one or more of line following and obstacle detection/avoidance. Thus, according to certain embodiments, navigation control system 122 is able to perform one or more of line following and obstacle detection/avoidance based on image information provided by a single image sensor 120 (though, of course, additional image sensors 120 could be used, if desired).

Due to the multi-pixel nature of the intensity map and the depth map, in certain embodiments, navigation control system 122 can detect at least a same number of objects as there are pixels (e.g., sixty-four in one example), all based on the image information provided by a single image sensor 120.

Additionally, image sensor 120 may have an increased field of view/detection range relative to conventional IR detectors that may be used for line following, potentially allowing for improved responsiveness and decision making by navigation control system 122 when adjustments are need to a movement path of robot 100. Furthermore, image sensor 120 may communicate image information 216 to navigation control system 122 in a digital format rather than in an analog voltage format used by typical IR sensors.

Although this disclosure is described with reference to embodiments that incorporate both line following and obstacle detection/avoidance, for a given application, navigation control system 122 may use only line-following or obstacle detection/avoidance. For example, instead of using line 104 as indicating a path to be followed, some embodiments might instead treat line 104 as an obstacle to be avoided and that can be detected, at least in part, using intensity map 400. In a particular implementation of this example, line 104 may serve as a boundary to any area within which robot 100 is free to move (potentially according to other navigational control algorithms, which might or might not be combined with detection of object detection described with reference to this disclosure).

Although robot 100 is shown and described primarily has having one image sensor 120 positioned at a generally central location toward what might be considered a front end of robot 100, robot 100 may include any suitable number of image sensors 120 positioned at any suitable locations within or on robot 100. For example, robot 100 may include an image sensor 120 at a "front" end of robot 100 and an image sensor 120 at a "back" end of robot 100 to assist with forward and reverse movement paths of robot 100, which may be particularly useful if robot 100 is unable to rotate about a vertical axis (with image sensor 120 rotating as well) to change directions. As another example, robot 100 may include one or more image sensors 120 oriented upward (such that the field of view 126 of the image sensor is directed upward), which could be useful for detection of overhead obstacles (e.g., a bridge or a portion of a piece of furniture) that might obstruct movement of robot 100 in a target movement path but that might not be detected by an image sensor 120 with a field of view 126 oriented to the floor. These examples are provided merely as possibilities.

Example embodiments of the invention are summarized here. Other embodiments can also be understood from the entirety of the specification as well as the claims filed herein.

Example 1. A mobile robot, including a drive subsystem, an image sensor, one or more processors, and a non-transitory computer-readable medium storing a computer program. The drive subsystem is configured to propel and steer the mobile robot. The image sensor is configured to generate image information for a scene in a movement path of the mobile robot. The image information includes for each of a first plurality of pixels, respective distance values for the scene, and for each of a second plurality of pixels, respective intensity values for the scene. The computer program includes instructions that, when executed by the one or more processors, cause the one or more processors to perform operations that include accessing the image information generated by the image sensor and analyzing the image information to determine whether to modify the movement path of the mobile robot. The operations further include initiating, in response to determining according to the image information to modify the movement path of the mobile robot, sending of a command to the drive subsystem to modify the movement path of the mobile robot.

Example 2. The mobile robot of Example 1, where a target movement path of the mobile robot is a line on a floor; determining according to the image information to modify the movement path of the mobile robot includes determining, according to the intensity values, that the movement path of the mobile robot has deviated from the target movement path of the mobile robot in a first direction; and the command includes an instruction to the drive subsystem to turn the mobile robot in a second direction to align the movement path of the mobile robot with the target movement path.

Example 3. The mobile robot of Example 2, where determining, according to the intensity values, that the movement path of the mobile robot has deviated from the target movement path of the mobile robot in the first direction includes determining that an intensity value for a particular pixel in the second plurality of pixels meets a predetermined condition.

Example 4. The mobile robot of any one of Examples 1-3, where determining according to the image information to modify the movement path of the mobile robot includes determining, according to the distance values, that an obstacle is detected.

Example 5. The mobile robot of Example 4, where determining, according to the distance values, that an obstacle is detected includes determining that a distance value for a particular pixel in the first plurality of pixels meets a predetermined condition.

Example 6. The mobile robot of any one of Examples 4-5, wherein the obstacle is an obstruction or a cliff.

Example 7. The mobile robot of any one of Examples 4-6, where the command includes an instruction to the drive subsystem to steer the mobile robot to avoid the obstacle or an instruction to the drive subsystem to stop the mobile robot.

Example 8. The mobile robot of any one of Examples 1-7, where a target movement path of the mobile robot is a line on a floor and the line includes a plurality of line segments separated by intervening gaps. The operations further include detecting, according to the intensity values, a first line segment at a first time, the first line segment associated with a first distance according to the distance values; detecting, according to an updated intensity values, the first line segment at a second time, the first line segment associated with a second distance according to an updated distance values; and calculating a velocity of the mobile robot based on the first distance, the second distance, the first time, and the second time.

Example 9. The mobile robot of any one of Examples 1-8, where the image sensor includes an optical source configured to illuminate the scene in a field of view of the optical source, a 2D detector array configured to receive optical signals reflected from illuminated objects in the scene in the field of view, and the image sensor is configured to extract a pixelated image of the scene from the 2D detector array. The pixelated image includes the image information.

Example 10. The mobile robot of any one of Examples 1-9, where the image sensor is a LIDAR system that measures distances using time-of-flight (ToF) measurements.

Example 11. The mobile robot of any one of Examples 1-10, where the image sensor is configured to provide the image information in a digital format.

Example 12. The mobile robot of any one of Examples 1-11, where the first plurality of pixels and the second plurality of pixels are a same number of pixels and have a one-to-one correspondence such that, for each pixel of the first plurality of pixels, a pixel of the first plurality of pixels and a corresponding pixel of the second plurality of pixels correspond to a same portion of the scene.

Example 13. A system, including an image sensor for attachment to a mobile robot and a non-transitory computer-readable medium storing a computer program. The image sensor is configured to capture an image of a scene in a movement path of the mobile robot. The image includes image information for each of a plurality of pixels of the scene, the image information including respective intensity values and respective distance values. The computer program includes instructions that, when executed by one or more processors, cause the one or more processors to perform operations comprising accessing the image information; analyzing the image information to determine whether to modify the movement path of the mobile robot; and initiating, in response to determining according to the image information to modify the movement path, sending of a command to a drive subsystem of the mobile robot to modify the movement path.

Example 14. The system of Example 13, where a target movement path of the mobile robot is a line on a floor; determining according to the image information to modify the movement path of the mobile robot includes determining, according to the intensity values, that the movement path of the mobile robot has deviated from the target movement path of the mobile robot in a first direction; and the command includes an instruction to the drive subsystem to turn the mobile robot in a second direction to align the movement path of the mobile robot with the target movement path.

Example 15. The system of Example 14, where determining, according to the intensity values, that the movement path of the mobile robot has deviated from the target movement path of the mobile robot in the first direction includes determining that an intensity value for a particular pixel in the plurality of pixels meets a predetermined condition.

Example 16. The system of any one of Examples 13-15, where determining according to the image information to modify the movement path of the mobile robot includes determining, according to the distance values, that an obstacle is detected. The command includes an instruction to the drive subsystem to steer the mobile robot to avoid the obstacle or an instruction to the drive subsystem to stop the mobile robot.

Example 17. The system of Example 16, where determining, according to the distance values, that the obstacle is detected includes determining that a distance value for a particular pixel of the plurality of pixels meets a predetermined condition.

Example 18. The system of any one of Examples 16-17, wherein the obstacle is an obstruction or a cliff.

Example 19. The system of any one of Examples 13-18, where a target movement path of the mobile robot is a line on a floor and the line includes a plurality of line segments separated by intervening gaps. The operations further include detecting, according to the intensity values, a first line segment at a first time, the first line segment associated with a first distance according to the distance values; detecting, according to updated intensity values, the first line segment at a second time, the first line segment associated with a second distance according to updated distance values; and calculating a velocity of the mobile robot based on the first distance, the second distance, the first time, and the second time.

Example 20. The system of any one of Examples 13-19, where the image sensor includes an optical source configured to illuminate the scene in a field of view of the optical source, a 2D detector array affixed to the mobile robot, and the image sensor is configured to extract a pixelated image of the scene from the 2D detector array. The pixelated image includes the image information.

Example 21. A method, including accessing image information for a scene in a movement path of a mobile robot. The image includes image information for each of a plurality of pixels of the scene, the image information comprising respective intensity values and respective distance values. The method includes analyzing the image information to determine whether to modify the movement path of the mobile robot. The method includes initiating, in response to determining according to the image information to modify the movement path of the mobile robot, sending of a command to a drive subsystem of the mobile robot to modify the movement path of the mobile robot.

Example 22. The method of Example 21, where a target movement path of the mobile robot is a line on a floor; determining according to the image information to modify the movement path of the mobile robot includes determining, according to the intensity values, that the movement path of the mobile robot has deviated from the target movement path of the mobile robot in a first direction; and the command includes an instruction to the drive subsystem to turn the mobile robot in a second direction to align the movement path of the mobile robot with the target movement path.

Example 23. The method of Example 22, where determining, according to the intensity values, that the movement path of the mobile robot has deviated from the target movement path of the mobile robot in the first direction includes determining that an intensity value for a particular pixel of the plurality of pixels meets a predetermined condition.

Example 24. The method of any one of Examples 21-23, where determining according to the image information to modify the movement path of the mobile robot includes determining, according to the distance values, that an obstacle is detected. The command includes an instruction to the drive subsystem to steer the mobile robot to avoid the obstacle or an instruction to the drive subsystem to stop the mobile robot.

Example 25. The method of Example 24, wherein determining, according to the distance values, that the obstacle is detected includes determining that a distance value for a particular pixel of the plurality of pixels meets a predetermined condition.

Example 26. The method of any one of Examples 21-25, where analyzing the image information to determine whether to modify the movement path of the mobile robot includes analyzing the distance values to determine whether an obstacle is present in the movement path of the mobile robot; determining, in response to determining that an obstacle is present in the movement path of the mobile robot, a first action; analyzing the intensity values to determine whether the movement path of the mobile robot has deviated from a target movement path of the mobile robot marked by a line on a floor; and determining, in response to determining that the movement path of the mobile robot has deviated from a target movement path of the mobile robot marked by a line on the floor, a second action. The method includes determining the command in accordance with the first action and the second action.

In the present description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., it is referred to the orientation of the drawings.

Various techniques have been described as multiple discrete operations to assist in understanding the various embodiments. The order of description should not be construed as to imply that these operations are necessarily order dependent. Operations described may be performed in a different order than the described embodiment. Various additional operations may be performed and/or described operations may be omitted in additional embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A mobile robot comprising:
a drive subsystem configured to propel and steer the mobile robot;
an image sensor configured to:
generate image information for a scene in a movement path of the mobile robot, the image information comprising:
for each of a first plurality of pixels, respective distance values for the scene;
for each of a second plurality of pixels, respective intensity values for the scene, wherein the image sensor is a single time-of-flight sensor configured to determine both the respective distance values for each pixel of the first plurality of pixels and the respective intensity values for each pixel of the second plurality of pixels;
one or more processors; and
a non-transitory computer-readable medium storing a computer program, the computer program comprising instructions that, when executed by the one or more processors, cause the one or more processors to perform operations comprising:
accessing the image information generated by the image sensor;
analyzing the image information to determine whether to modify the movement path of the mobile robot, wherein a target movement path of the mobile robot is a line on a floor, and wherein analyzing the image information to determine whether to modify the movement path of the mobile robot comprises:
analyzing the respective distance values for each pixel of the first plurality of pixels to detect an obstacle in the movement path of the mobile robot;
detecting, by analyzing the respective intensity values for each pixel of the first plurality of pixels, the line on the floor; and
determining, according to the respective intensity values for each pixel of the second plurality of pixels, whether the mobile robot is deviating from the line on the floor by determining whether the respective intensity values for one or more pixels of the second plurality of pixels meet one or more predetermined conditions, wherein determining according to the image information to modify the movement path of the mobile robot comprises determining, according to the respective intensity values for each pixel of the second plurality of pixels, that the movement path of the mobile robot has deviated from the target movement path of the mobile robot in a first direction, wherein determining, according to the respective intensity values for each pixel of the second plurality of pixels, that the movement path of the mobile robot has deviated from the target movement path of the mobile robot in the first direction comprises determining that an intensity value for a particular pixel in the second plurality of pixels meets a predetermined condition; and
initiating, in response to determining according to the image information to modify the movement path of the mobile robot, sending of a command to the drive subsystem to modify the movement path of the mobile robot.

2. The mobile robot of claim 1, wherein the command comprises an instruction to the drive subsystem to turn the mobile robot in a second direction to align the movement path of the mobile robot with the target movement path.

3. The mobile robot of claim 1, wherein determining according to the image information to modify the movement path of the mobile robot comprises determining, according to the respective distance values for each pixel of the first plurality of pixels, that the obstacle is detected.

4. The mobile robot of claim 3, wherein determining, according to the respective distance values for each pixel of the first plurality of pixels, that the obstacle is detected comprises determining that a distance value for a particular pixel in the first plurality of pixels meets a predetermined condition.

5. The mobile robot of claim 3, wherein the obstacle is an obstruction or a cliff.

6. The mobile robot of claim 3, wherein the command comprises:
an instruction to the drive subsystem to steer the mobile robot to avoid the obstacle; or
an instruction to the drive subsystem to stop the mobile robot.

7. The mobile robot of claim 1, wherein:
the line comprises a plurality of line segments separated by intervening gaps; and
the operations further comprise:
detecting, according to the respective intensity values for each pixel of the second plurality of pixels, a first line segment at a first time, the first line segment associated with a first distance according to the respective distance values for each pixel of the first plurality of pixels;
detecting, according to updated intensity values, the first line segment at a second time, the first line segment associated with a second distance according to updated distance values; and
calculating a velocity of the mobile robot based on the first distance, the second distance, the first time, and the second time.

8. The mobile robot of claim 1, wherein the image sensor comprises:
an optical source configured to illuminate the scene in a field of view of the optical source;
a two-dimensional (2D) detector array configured to receive optical signals reflected from illuminated objects in the scene in the field of view; and
the image sensor is configured to extract a pixelated image of the scene from the 2D detector array, the pixelated image comprising the image information.

9. The mobile robot of claim 1, wherein the image sensor is a light detection and ranging (LIDAR) system that measures distances using time-of-flight measurements.

10. The mobile robot of claim 1, wherein the image sensor is configured to provide the image information in a digital format.

11. The mobile robot of claim 1, wherein the first plurality of pixels and the second plurality of pixels are a same number of pixels and have a one-to-one correspondence such that, for each pixel of the first plurality of pixels, a pixel of the first plurality of pixels and a corresponding pixel of the second plurality of pixels correspond to a same portion of the scene.

12. A system comprising:
an image sensor for attachment to a mobile robot and configured to capture an image of a scene in a movement path of the mobile robot, the image comprising image information for each of a plurality of pixels of the scene, the image information comprising respective intensity values and respective distance values for each pixel of the plurality of pixels, wherein the image sensor is a single time-of-flight sensor configured to determine both the respective intensity values and the respective distance values for each pixel of the plurality of pixels; and
a non-transitory computer-readable medium storing a computer program, the computer program comprising instructions that, when executed by one or more processors, cause the one or more processors to perform operations comprising:
accessing the image information;
analyzing the image information to determine whether to modify the movement path of the mobile robot, wherein a target movement path of the mobile robot is a line on a floor, wherein the line comprises a plurality of line segments separated by intervening gaps, and wherein analyzing the image information to determine whether to modify the movement path of the mobile robot comprises analyzing the respective intensity values for each pixel of the plurality of pixels to detect a line on a floor and analyzing the respective distance values for each pixel of the plurality of pixels to detect an obstacle in the movement path of the mobile robot;
initiating, in response to determining according to the image information to modify the movement path of the mobile robot, sending of a command to a drive subsystem of the mobile robot to modify the movement path of the mobile robot;
detecting, according to the respective intensity values for each pixel of the plurality of pixels, a first line segment at a first time, the first line segment associated with a first distance according to the respective distance values for each pixel of the plurality of pixels;
detecting, according to updated intensity values, the first line segment at a second time, the first line segment associated with a second distance according to updated distance values; and
calculating a velocity of the mobile robot based on the first distance, the second distance, the first time, and the second time.

13. The system of claim 12, wherein:
determining according to the image information to modify the movement path of the mobile robot comprises determining, according to the respective intensity values for each pixel of the plurality of pixels, that the movement path of the mobile robot has deviated from the target movement path of the mobile robot in a first direction; and
the command comprises an instruction to the drive subsystem to turn the mobile robot in a second direction to align the movement path of the mobile robot with the target movement path.

14. The system of claim 13, wherein determining, according to the respective intensity values for each pixel of the plurality of pixels, that the movement path of the mobile robot has deviated from the target movement path of the mobile robot in the first direction comprises determining that an intensity value for a particular pixel in the plurality of pixels meets a predetermined condition.

15. The system of claim 12, wherein:
determining according to the image information to modify the movement path of the mobile robot comprises determining, according to the respective distance values for each pixel of the plurality of pixels, that the obstacle is detected; and
the command comprises:
an instruction to the drive subsystem to steer the mobile robot to avoid the obstacle; or
an instruction to the drive subsystem to stop the mobile robot.

16. The system of claim 15, wherein determining, according to the respective distance values for each pixel of the plurality of pixels, that the obstacle is detected comprises determining that a distance value for a particular pixel of the plurality of pixels meets a predetermined condition.

17. The system of claim 15, wherein the obstacle is an obstruction or a cliff.

18. The system of claim 12, wherein the image sensor comprises:
an optical source configured to illuminate the scene in a field of view of the optical source;
a two-dimensional (2D) detector array affixed to the mobile robot; and
the image sensor is configured to extract a pixelated image of the scene from the 2D detector array, the pixelated image comprising the image information.

19. A method comprising:
accessing image information for a scene in a movement path of a mobile robot, the image information captured by an image sensor and comprising image information for each of a plurality of pixels of the scene, the image information comprising respective intensity values and respective distance values for each pixel of the plurality of pixels, wherein the image sensor is a single time-of-flight sensor configured to determine both the respective intensity values and the respective distance values for each pixel of the plurality of pixels;
analyzing, by a processing device, the image information to determine whether to modify the movement path of the mobile robot, wherein analyzing the image information to determine whether to modify the movement path of the mobile robot comprises analyzing the respective intensity values for each pixel of the plurality of pixels to detect a line on a floor and analyzing the respective distance values for each pixel of the plurality of pixels to detect an obstacle in the movement path of the mobile robot, wherein:
a target movement path of the mobile robot is the line on the floor; and
determining according to the image information to modify the movement path of the mobile robot comprises determining, according to the respective intensity values for each pixel of the plurality of pixels, that the movement path of the mobile robot has deviated from the target movement path of the mobile robot in a first direction, wherein determining, according to the respective intensity values for each pixel of the plurality of pixels, that the movement path of the mobile robot has deviated from the target movement path of the mobile robot in the first direction comprises determining that an intensity value for a particular pixel of the plurality of pixels meets a predetermined condition; and initiating, by a processing device in response to determining according to the image information to modify the movement path of the mobile robot, sending of a command to a drive subsystem of the mobile robot to modify the movement path of the mobile robot.

20. The method of claim 19, wherein the command comprises an instruction to the drive subsystem to turn the mobile robot in a second direction to align the movement path of the mobile robot with the target movement path.

21. The method of claim 19, wherein:
determining according to the image information to modify the movement path of the mobile robot comprises determining, according to the respective distance values for each pixel of the plurality of pixels, that the obstacle is detected; and
the command comprises:
an instruction to the drive subsystem to steer the mobile robot to avoid the obstacle; or
an instruction to the drive subsystem to stop the mobile robot.

22. The method of claim 21, wherein determining, according to the respective distance values for each pixel of the plurality of pixels, that the obstacle is detected comprises determining that a distance value for a particular pixel of the plurality of pixels meets a predetermined condition.

23. The method of claim 19, wherein:
analyzing the image information to determine whether to modify the movement path of the mobile robot comprises:
determining, in response to determining that an obstacle is present in the movement path of the mobile robot, a first action;
analyzing the respective intensity values for each pixel of the plurality of pixels to determine whether the movement path of the mobile robot has deviated from a target movement path of the mobile robot marked by the line on the floor; and
determining, in response to determining that the movement path of the mobile robot has deviated from the target movement path of the mobile robot marked by the line on the floor, a second action; and
the method further includes determining the command in accordance with the first action and the second action.

* * * * *